(12) United States Patent
Motoi et al.

(10) Patent No.: US 6,605,343 B1
(45) Date of Patent: Aug. 12, 2003

(54) COMPOSITE MATERIAL AND SYNTHETIC SLEEPER USING THE COMPOSITE MATERIAL

(75) Inventors: Koji Motoi, Kyoto (JP); Ryuichi Matsuo, Kyoto (JP); Takeshi Muranaka, Kyoto (JP); Takumi Murata, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/673,692

(22) PCT Filed: Dec. 1, 1999

(86) PCT No.: PCT/JP99/06747

§ 371 (c)(1),
(2), (4) Date: Dec. 13, 2000

(87) PCT Pub. No.: WO00/50233

PCT Pub. Date: Aug. 31, 2000

(30) Foreign Application Priority Data

| Feb. 22, 1999 | (JP) | 11-043171 |
| Mar. 17, 1999 | (JP) | 11-072296 |
| Apr. 14, 1999 | (JP) | 11-106649 |
| Jul. 27, 1999 | (JP) | 11-212306 |
| Jul. 30, 1999 | (JP) | 11-216963 |
| Aug. 31, 1999 | (JP) | 11-245318 |

(51) Int. Cl.⁷ .............................................. B32B 27/12

(52) U.S. Cl. ............... 428/298.1; 428/107; 428/113; 428/114; 428/195; 428/206; 428/213; 428/219; 428/297.4; 428/297.7; 428/323; 428/332; 428/333; 428/364; 428/401; 428/407

(58) Field of Search ............................. 428/107, 114, 428/195, 901, 209, 220, 295.1, 340, 349, 364, 113, 206, 213, 219, 297.4, 297.7, 323, 332, 333, 401, 407

(56) References Cited

U.S. PATENT DOCUMENTS 5,662,761 A * 9/1997 Middelman et al. ........ 156/324
5,837,179 A * 11/1998 Pihl et al. .............. 264/172.11

* cited by examiner

Primary Examiner—Merrick Dixon
(74) Attorney, Agent, or Firm—Frishauf, Holtz, Goodman & Chick, P.C.

(57) ABSTRACT

A composite material comprising a core layer comprising filler and synthetic resin and containing the filler having a weight 0.7 times or more the product of volume of the core layer and bulk density of the filler; and a surface layer comprising a thermosetting resin reinforced by long fibers extending parallel in a longitudinal direction thereof, the surface layer being laminated on the core layer to cover at least one surface of the core layer with respect to a thickness direction thereof.

30 Claims, 10 Drawing Sheets

COMPOSITE MATERIAL AND SYNTHETIC SLEEPER USING THE COMPOSITE MATERIAL

This application is a United States national phase application of International application PCT/JP99/06747 filed Dec. 1, 1999.

TECHNICAL FIELD

The present invention relates to a composite material and a synthetic cross tie using the composite material.

BACKGROUND ART

Fiber reinforced foam thermosetting resin molded goods, which resemble native wood in appearance and show performances in physical properties equal to or more than native wood, are used as constitute materials including building material, structural material, cross tie, and board material used for waterish places.

In general, the foam thermosetting resin molded goods of this type have a plate-like or bar-like molded main body which is formed by the foam thermosetting resin liquid being foamed and cured, as disclosed by Japanese Patent Publication No. Sho 52-2421 and Japanese Laid-open Patent Publication No. Hei 5-23947. In an interior of the main body, glass fibers having long fibers are paralleled in the longitudinal direction as reinforced fibers and dispersed in generally parallel.

This conventional type of foam thermosetting resin molded goods have a sufficient strength against a bending stress exerted in a direction orthogonal to the longitudinal direction in that the reinforced fibers are paralleled in the longitudinal direction and dispersed generally parallel in the interior of the molded main body. However, they have the disadvantage that for example, when nailed, they are easily cracked or fractured in a direction parallel to the reinforced fibers or the disadvantage that they have a low unnailing strength.

In view of this, there was proposed a composite material in which surface layers, which comprises foam thermosetting resin and in which reinforced fibers are paralleled in the longitudinal direction and dispersed in generally parallel, are laminated on both surfaces of a core layer comprising foam thermosetting resin in which not more than 50 weight % of filler is dispersed (Cf. JP Laid-open Patent Publication No. Hei 5-138797).

In short, this composite material is made to have a sandwich structure in which the core layer of excellent in compressive strength is sandwiched between the surface layers to thereby produce improved compression strength and nailing performance.

However, since this composite material has, as shown in FIG. 17, the structure that thermosetting resin layer 300 exists between the filler 200 of the core layer 100 and the filler 200, it has the disadvantage that its compression strength and nailing performance are insufficiently improved.

Also, it suffers from the disadvantage that when the composite material is deflected largely or bent repeatedly, the thermosetting resin layer 300 is destroyed.

In the consideration of these circumstances, the present invention has been made with the aim to provide a composite material capable to further improve its compression strength and nailing performance and a synthetic cross tie using the composite material.

DISCLOSURE OF THE INVENTION

To achieve this object, a composite material according to the present invention as set forth in claim 1 (hereinafter it is referred to as "the composite material of claim 1") comprises a core layer comprising filler and synthetic resin and containing the filler having a weight 0.7 times or more the product of volume of the core layer and bulk density of the filler; and a surface layer comprising a thermosetting resin reinforced by long fibers extending parallel in a longitudinal direction thereof, the surface layer being laminated on the core layer to cover at least one surface of the core layer with respect to a thickness direction thereof.

A composite material according to the present invention as set forth in claim 2 (hereinafter it is referred to as "the composite material of claim 2") comprises a core layer comprising filler and synthetic resin and containing the filler having a weight 0.7 times or more the product of volume of the core layer and bulk density of the filler; and a surface layer comprising a thermosetting resin including lightweight filler reinforced by long fibers extending parallel in a longitudinal direction thereof, the surface layer being laminated on the core layer to cover at least one surface of the core layer with respect to a thickness direction thereof.

The composite material according to the present invention as set forth in claim 3 (hereinafter it is referred to as "the composite material of claim 3") features that in the composite material of claim 1 or 2, the surface layer has a density of 0.3 g/cm$^3$ or more to 1.5 g/cm$^3$ or less.

The composite material according to the present invention as set forth in claim 4 (hereinafter it is referred to as "the composite material of claim 4") features that in the composite material of any one of claims 1 through 3, it comprises a surface layer having a bending modulus of 6,000 MPa or more and a bending strength of 100 MPa or more.

The composite material according to the present invention as set forth in claim 5 (hereinafter it is referred to as "the composite material of claim 5") features that in the composite material of any one of claims 1 through 4, the filler having an average particle size of 0.5 mm or more is used.

The composite material according to the present invention as set forth in claim 6 (hereinafter it is referred to as "the composite material of claim 6") features that in the composite material of any of claims 1 through 5, the filler has two or more peak areas that constitute 8 volume % or more on a particle size distribution curve plotting particle size in abscissa and a volume ratio of filler per particle size to all fillers in ordinate and also has the size distribution that most frequent particle size values in the smaller peak area of 8 volume % or more is 0.7 or less of most frequent particle size values in the larger peak area of 8 volume % or more next to the smaller peak area.

The composite material according to the present invention as set forth in claim 7 (hereinafter it is referred to as "the composite material of claim 7") features that in the composite material according to any of claims 1 through 6, thermosetting resin is used as the synthetic resin forming the core layer.

The composite material according to the present invention as set forth in claim 8 (hereinafter it is referred to as "the composite material of claim 8") features that in the composite material of any of claims 1 through 6, thermoplastic resin is used as the synthetic resin forming the core layer.

The composite material according to the present invention as set forth in claim 9 (hereinafter it is referred to as "the composite material of claim 9") features that in the composite material of any of claims 1 through 7, thermosetting polyurethane resin foam of polyol equivalent of 230 or more to 1,500 or less or thermosetting polyurethane resin foam having a density of 0.3 g/cm³ or more and polyol equivalent of 1,500 or less is used as the synthetic resin forming the core layer.

A composite material according to the present invention as set forth in claim 10 (hereinafter it is referred to as "the composite material of claim 10") comprises a core layer comprising filler and synthetic resin and a surface layer comprising synthetic resin foam and laminated on the core layer to cover at least one surface of the core layer with respect to a thickness direction thereof, wherein a variation, curve of bending stress of the core layer that varies with the bending and deflection has a singular point at which slope of the tangent line decreasing gradually from the point in time at which the bending is started increases again before becoming negative.

The composite material according to the present invention as set forth in claim 11 (hereinafter it is referred to as "the composite material of claim 11") features that in the composite material of claim 10, thermosetting resin foam reinforced by long fibers extending parallel in a longitudinal direction thereof is used as the synthetic resin foam.

The composite material according to the present invention as set forth in claim 12 (hereinafter it is referred to as "the composite material of claim 12") features that in the composite material of claim 10 or 11, the core layer has deflection of 0.8% or less at the singular point.

The composite material according to the present invention as set forth in claim 13 (hereinafter it is referred to as "the composite material of claim 13") features that in the composite material of any of claim 10 through 12, the core layer has the bending modulus of 800 MPa or more when further deflected from deflection at the singular point.

The composite material according to the present invention as set forth in claim 14 (hereinafter it is referred to as "the composite material of claim 14") features that in the composite material of any of claim 1 through 13, the core layer is formed by a plurality of core layer forming composition layers.

The composite material according to the present invention as set forth in claim 15 (hereinafter it is referred to as "the composite material of claim 15") features that in the composite material of claim 14, one of the core layer forming composition layers is formed of thermosetting resin reinforced by long fibers extending parallel in a longitudinal direction thereof or thermosetting resin including lightweight filler reinforced by long fibers extending parallel in a longitudinal direction thereof.

A composite material according to the present invention as set forth in claim 16 (hereinafter it is referred to as "the composite material of claim 16") comprises a core layer comprising synthetic resin as a main component and a surface layer comprising foam thermosetting resin reinforced by long fibers extending parallel in a longitudinal direction thereof or elastic synthetic resin reinforced by long fibers extending parallel in a longitudinal direction thereof and laminated on the core layer to cover both surfaces of the core layer with respect to a thickness direction thereof, wherein the core layer and the surface layer have the relation that satisfies the equations of $CSa \geq \frac{1}{2} \times CSb$, $Ea < Eb$, and $ESa \geq \frac{1}{2} \times ESb$ (where CSa represents yield strain in compression of the core layer; CSb represents yield strain in compression of the surface layer; Ea represents a tension elasticity modulus of the core layer; Eb represents a tension elasticity modulus of the surface layer; ESa represents yield strain in tension of the core layer; and ESb represents yield strain in tension of the surface layer).

The composite material according to the present invention as set forth in claim 17 (hereinafter it is referred to as "the composite material of claim 17") features that in the composite material of claim 16, it follows that $0.005 \leq CSa$, $50 \text{ MPa} \leq Ea$, $0.005 \leq ESa$, $0.01 \leq CSb$, $5,000 \text{ MPa} \leq Eb \leq 18,000 \text{ MPa}$, and $0.01 \leq ESb$.

The composite material according to the present invention as set forth in claim 18 (hereinafter it is referred to as "the composite material of claim 18") features that in the composite material of any of claims 1 through 17, the core layer has a compression shear strength DBa of 5 MPa or more.

The composite material according to the present invention as set forth in claim 19 (hereinafter it is referred to as "the composite material of claim 19") features that in the composite material of any of claims 1 through 18, the core layer and the surface layer are integrally adhesive bonded to each other through an intermediate layer comprising non-foam thermosetting resin or low-power foam resin.

The composite material according to the present invention as set forth in claim 20 (hereinafter it is referred to as "the composite material of claim 20") features that in the composite material of claim 19, an intermediate layer portion has the compression shear strength of 6 MPa or more, or the surface layer and the core layer both have the compression shear strength of 6 MPa or more, when compressive force is applied to the composite material in a direction parallel to the fiber extending direction of the long fibers of the surface layer so that a breaking surface can be formed in the intermediate layer portion, and wherein the composite material has the physical property that either the surface layer or the core layer is first broken when the compressive force is applied to the composite material in the direction parallel to the fiber extending direction of the long fibers of the surface layer so that the breaking surface can be formed in the intermediate layer portion.

The composite material according to the present invention as set forth in claim 21 (hereinafter it is referred to as "the composite material of claim 21") features that in the composite material of claim 19 or 20, a resin-impregnated sheet-like material is interposed in the intermediate layer.

The composite material according to the present invention as set forth in claim 22 (hereinafter it is referred to as "the composite material of claim 22") features that in the composite material of claims 1 through 7 and claims 9 through 21, polyurethane resin foam is used as the synthetic resin of the core layer and polyurethane resin foam is used as the synthetic resin of the surface layer.

The composite material according to the present invention as set forth in claim 23 (hereinafter it is referred to as "the composite material of claim 23") features that in the composite material of any of claims 1 through 22, which has a total thickness of 100 mm or more and a ratio between a thickness of the core layer and a sum total of thickness of the surface layer covering the core layer in the thickness direction is within the range of 9/1 to 1/1.

The composite material according to the present invention as set forth in claim 24 (hereinafter it is referred to as "the composite material of claim 24") features that in the composite material of claim 15 or 23, the core layer has at least two core layer forming composition layers (A) comprising filler and synthetic resin and at least one core layer forming composition layer (B) comprising thermosetting resin reinforced by long fibers interposed between two core layer forming compositions (A),(A) of the at least two core layer forming composition layers (A) and extending parallel in a longitudinal direction of the composite material, and a ratio between a sum total of thickness of the core layer forming composition layer (A) and a sum total of thickness of the core layer forming composition layer (B) is within the range of 95/5 to 50/50.

The composite material according to the present invention as set forth in claim 25 (hereinafter it is referred to as "the composite material of claim 25") features that in the composite material of any of claims 1 through 24, the surface layer is laminated on the core layer to cover at least two surfaces of the corer layer with respect to a thickness direction thereof; the composite material has a total thickness of 100 mm or more with respect to a thickness direction thereof; a thickness of the surface layer on the side thereof on which a pulling force is exerted when the composite material is bent in the thickness direction is 5% or more to 25% or less of the total thickness; and the thickness of the surface layer on the side thereof on which a compressive force is exerted is 1.5% or more to 15% or less of the total thickness.

The composite material according to the present invention as set forth in claim 26 (hereinafter it is referred to as "the composite material of claim 26") features that in the composite material of any of claims 1 through 25, the surface layer surrounds four surfaces of the core layer and constitutes 10 volume % or more to 65 volume % or less of the total of the composite material.

A synthetic cross tie according to the present invention as set forth in claim 27 (hereinafter it is referred to as "the cross tie of claim 27") uses a composite material according to any of claims 1 through 26.

In the following, the constitution of the composite materials of the respective Claims will be described in detail.

While the synthetic resins which may be used for the core layer in the composite materials of claims 1 through 6 include thermosetting resins as in the composite material of claim 7 and thermoplastic resin as in the composite material of claim 8, the mixture of thermosetting resin and thermoplastic resin may be used.

While no particular limitation is imposed on the thermosetting resins used for the core layer, the thermosetting resins which may be used include the resins which are in liquid form or powder form before reaction and are of foamable, including, for example, polyurethane resin, phenol resin, unsaturated polyester resin, diallyl phthalate resin, vinyl ester resin, epoxy resin, urea resin, melamine resin, polyimide resin, polyamide-imide resin, acrylic resin, natural rubber, and synthetic rubber. These may be used in combination of two or more.

While no particular limitation is imposed on the thermoplastic resins used for the core layer, the thermoplastic resins which may be used include, for example, polystyrene, syndiotactic polystyrene, high-density polyethylene, low-density polyethylene, linear low-density polyethylene, polypropylene, rigid polyvinyl chloride, acrylic resin, ABS resin, aliphatic polyamide (nylon) resin, polyethylene terephthalate, polybutylene terephthalate, polyoxymethylene, polycarbonate, polyarylate, polysulfone, polyether sulfone, polyether ether ketone, and polyphenylene sulfide, or copolymer thereof and blend thereof. Also, these may be of foamable.

Further, of these thermoplastic resins, crystalline resins have preferably a melting point of 80° C. or more, or further preferably 120° C. or more. On the other hand, non-crystalline resins have preferably a glass transition point of 80° C. or more, or further preferably 100° C. or more. With the melting point and the glass transition point lower than these temperatures, there is the possibility that the bending properties and the heat resisting properties may reduce.

The filler having a coefficient. of thermal expansion approximating to that of the long fibers for use in the surface material should preferably be used.

While no particular limitation is imposed on the thermosetting resins. used for the surface layer in the composite materials of claims 1 through 4, the thermosetting resins which may be used include the resins which are in liquid form or powder form before reaction and are of foamable, including, for example, polyurethane resin, phenol resin, unsaturated polyester resin, diallyl phthalate resin, vinyl ester resin, epoxy resin, urea resin, melamine resin, polyimide resin, polyamide-imide resin, and acrylic resin.

The foam thermosetting resins used for the surface layer include heat decomposable foaming agents, such as azo compound and sodium bicarbonate, solvent foaming agents, such as fleon, carbon deoxide and pentane, and foam thermosetting resin liquids including those from which gas is formed as by-product in the reaction and curing. For example, rigid or semi-rigid polyurethane foam, phenol foam, low-power polyester foam can be cited.

Polyurethane foam, in particular, is preferably used in that it has a relatively high mechanical strength and can easily form closed cells, when foamed, and thus has excellent unabsorbent.

While no particular limitation is imposed on the lightweight filler used in the surface layer in the composite material of claim 2, the lightweight fillers which may be used include, for example, powder/granular material, foam particle and hollow particle, such as glass hollow particle, silica balloon, fly ash balloon, shirasu balloon, porous glass, expanded shale, porous ceramics, perlite, pumice, vermiculite and synthetic resin. Synthetic resins which may be used as the lightweight filler include the same thermosetting resin curing material and rosslinked rubber as those used for the surface layer, and further include crystalline thermoplastic resin having a higher melting point than a temperature at which the thermosetting resin is cured and non-crystalline thermoplastic resin having a glass transition point. Those having closed cells are preferably used to reduce percentage of absorption of the composite material. The lightweight filler may be surface-treated with a silane coupling agent and the like.

In the composite material of claim 1 or 2, the surface layer has preferably a density of 0.3 g/cm$^3$ or more to 1.5 g/cm$^3$ or less. The reason therefor is that a too small density of the surface layer causes the bending strength of the composite material to reduce, while on the other hand, a too large density of the surface layer causes the composite material to be easily cracked when nailed. The preferable density range varies depending on the intended use of the composite material. For example, for using the composite material to a railway sleeper, the surface layer has further preferably a density of 0.6 g/cm$^3$ or more to 1.5 g/cm$^3$ or less. For using the composite material to loading platform material or flooring material of a floating bridge, a track and a boat, the surface layer has further preferably a density of 0.3 g/cm$^3$ or more to 0.8 g/cm$^3$ or less.

In the composite material of claims 1 through 5, the long fiber is not limited to any particular configuration, as far as it has the capability as the reinforced fiber. The long fibers which may be used include, for example, mono-filament, fibril (a feathered fiber) chemical cellulose and weaving yarn. The materials thereof include organic materials, such as glass, carbon and synthetic resin. Glass or carbon which produces a large reinforcing effect is of preferable. These may be used singularly or in combination of two or more.

While the percentage of the long fibers contained in the surface layer is not particularly limited, 5 volume % or more to 40 volume % or less is of preferable. A less than 5 volume % of long fibers produce no reinforcing effects such as the bending strength. On the other hand, an excess of 40 volume % of long fibers may produce a possible fracture running parallel to the fibers when the composite material is nailed.

When the thermosetting resin of the surface layer is foamable material, the resin density is preferably 0.2 g/cm$^3$ or more. A less than 0.2 g/cm$^3$ resin density provides undesirable reduction of the bending strength. No particular upper limit is specified. An upper limit of a resin density of the surface layer is substantially equal to that of the foam thermosetting resin that can substantially be produced.

In the composite material of claim 3, the surface layer preferably contains 20 volume % or more to 50 volume % or less of lightweight filler, in order to satisfy the above-noted proportion of the long fibers and the resin density of the thermosetting resin of foamable material. With a less than 20 volume % of lightweight filler, the surface layer is easily cracked when nailed. On the other hand, with an excess of 50 volume % of lightweight filler, the lightweight fillers are not uniformly dispersed in the thermosetting resin, so that there is the possibility that the physical properties, such as the bending strength, may be reduced.

In the composite material of claims 1 through 3, the bending modulus of the surface layer is preferably 6,000 MPa or more, as in the composite material of claim 4, further preferably 7,000 MPa or more, or still further preferably 8,000 MPa or more. The reason is that a less than 6,000 MPa bending modulus can cause reduction of the bending modulus of the entire composite material, so there is the possibility that, for example, when used to railway sleepers, the composite materials may deflect largely to easily cause deviation of a rail track. No particular upper limit of the bending modulus is specified. An upper limit of the bending modulus of the surface layer is substantially equal to that of the surface layer that can substantially be produced.

In the composite material of claims 1 through 3, the bending strength of the surface layer is preferably 100 MPa or more, as in the composite material of claim 4, or further preferably 120 MPa. The reason is that with a less than 100 MPa bending strength, there is the possibility that when used to cross ties, the composite materials may easily reduce in long-term bending durability.

The bending modulus and the bending strength are measured in accordance with the method prescribed by JIS Z 2101. The bending load is applied to a test piece in a direction vertical to a longitudinal direction of the test piece with the long-fiber extending direction as the longitudinal direction.

In the composite material of claims 5 through 9, the same resins as those used in the composite material of claims 1 through 4 can be used as the resin for use in the surface layer.

In the composite material of claim 5, the average particle size of the filler except the fibers is limited to 0.5 mm or more. The reason is that with a less than 0.5 mm average particle size of the filler, when the filler having a weight 0.7 times or more the product of volume of the core layer and bulk density of the filler is tried to be contained, sufficient dispersion is not achieved in the mixing process of the filler and the synthetic resin, so that the resin cannot adhere to the filler uniformly and thus there is the possibility that satisfactory physical properties, such as the bending strength, cannot be obtained. The upper limit of the particle size of the filler is preferably made to be substantially smaller than the thickness of the core layer. If the filler having a diameter that will be substantially larger than the thickness of the core layer is used, then there is the possibility that the nailing property varies so largely, depending on the places to be nailed, that the material cannot withstand continued use.

In the present invention, the particle size can be obtained by sifting with a standard screen prescribed by JIS Z 8801. Combination of basic dimensions of meshes of typical screens for use in the sifting is selected from:
4.00 mm, 2.80 mm, 2.00 mm, 1.40 mm, 1.00 mm, 850 $\mu$m, 500 $\mu$m, 300 $\mu$m, 212 $\mu$m, 106 $\mu$m, and 75 $\mu$m. Additional screens with different dimensions of meshes may properly be added.

The value of the particle size of the filler is expressed by the basic dimensions of meshes of the screens. The average particle size of the filler is a value obtained by summing the products of volume ratios of the fillers remaining in the respective screens to the total fillers except the fibers and the values of particle sizes over all the screens.

While no particular limitation is imposed on the filler in the composite material of the present invention, the fillers which may be used include, for example, amorphous powders, such as powder/granular rock, glass powder, quartz powder, calcium silicate, ground cement concrete, river sand, sea sand and silica sand, inorganic short fiber powders, such as wollastonite, inorganic powder/granular material having cells, such as expanded shale, pumice and glass foam, pulverized resins, such as pulverized polyvinyl chloride, pulverized fiber-reinforced resin and pulverized fiber-reinforced foam polyurethane, inorganic powder having a relatively small particle size, such as calcium carbonate, fly ash, mica, talc, clay, alumina, vermiculite and sludge dry powder/granular material, and granulated materials thereof previously bonded by resin. These may be used singularly or in combination of two or more.

The fibrous fillers which may be used include inorganic fibers, such as glass fiber, carbon fiber and boron fiber, and organic short fibers, such as vinylon fiber, polyester fiber, aliphatic polyamide fiber and aromatic polyamide.

Also, the above-noted inorganic fillers as surface-treated by silane coupling agent may be used. When the polyurethane resin is used for the resin in the surface layer, silane coupling agent having a fimctional group which reacts with an isocyanate group, such as a mercapto group, an amino group and an imino group, is preferably used.

In the composite material of claim 6, the filler used has two or more peak areas that constitute 8 volume % or more on a particle size distribution curve plotting particle size in abscissa and a volume ratio of filler per particle size to all fillers in ordinate and also has the size distribution that most frequent particle size values in the smaller peak area of 8 volume % or more is 0.7 or less of most frequent particle size values in the larger peak area of 8 volume % or more next to the smaller peak area. The reason is that the mixture of fillers of different particle sizes can facilitate the mixture and impregnation into the synthetic resin, especially the thermosetting resin, and further can facilitate increase of amount of filler added, to significantly enhance the laminating effect of the core layer and the surface layer. In addition to this, the size distribution peaks at two or more points, and as such can allow the resin to moderately filled in between the fillers. As a result of this, the composite material, when nailed, is resiliently compressed without the core layer being destroyed and the resilience provides improved nail holding ability and durability against the repeatedly applied unnailing force.

For the composite material of claim 5, the size distribution curve in the composite material of claim 6 is obtained by plotting a volume ratio of the filler per particle size to all fillers except the fibers obtained in the same manner with respect to the each particle size. The volume ratio shows a volume ratio between the fillers screened with neighboring screens of basic dimensions.

The phrase of "the larger peak area of 8 volume % or more next to the smaller peak area" is intended to mean that if a peak area of less than 8 volume % exists between the large and small peak areas, such a peak area of less than 8 volume % is not taken as the larger peak area of 8 volume % or more next to the small peak area.

The volume % of the peak area is obtained as a percentage of an area surrounded by the distribution curve extending between its boundaries intersecting the abscissa axis and the abscissa, in the case of its boundaries not intersecting the abscissa, an area surrounded by the distribution curve extending between minimum value points and the abscissa (in the case of using the minimum values, an area surrounded by the distribution curve, the abscissa, and perpendicular lines dropped from the minimum value points to the abscissa) to a total area bounded. by the whole distribution curve and the abscissa, as shown in FIG. 18.

If the peak area has a tabletop peak extending parallel to the abscissa, a center of the parallel extending part is taken as the most frequent particle size value.

In the composite material of claim 6, no particular limitation is imposed on the fillers providing larger values of the most frequent particle sizes. The fillers include, for example, amorphous granular materials, such as granular rock, granular glass, calcium silicate, ground cement concrete, river sand, sea sand and silica sand, inorganic short fiber powders, such as wollastonite, inorganic powder/granular material having cells, such as expanded shale, pumice and glass foam, inorganic powder/granular materials having a relatively small particle size, such as pulverized vinyl chloride, pulverized fiber-reinforced resin, calcium carbonate and fly ash, and sludge dry powder/granular material, and granulated materials thereof previously bonded by resin. On the other hand, no particular limitation is imposed on the fillers providing smaller values of the most frequent particle sizes. The preferable fillers include, for example, powdered silica sand, quartz, mica, talc, clay and alumina and additionally include those belonging to sludge dry powder/granular material and inorganic powder/granular material. These may be used singularly or in combination of two or more. Further, the above-noted inorganic fillers as surface-treated by silane coupling agent may be used. When the polyurethane resin is used for the resin in the surface layer, silane coupling agent having an active hydrogen which reacts with an isocyanate group, such as a mercapto group, an amino group and an imino group, is preferably used.

In the composite material of claim 9, the polyol equivalent means a value calculated from the following equation (1). The measuring method is as follows. After the resin is hydrolyzed, amine originating from isocyanate component is removed through ion exchange resin, alkaline cleaning and the like so that polyol component can be recovered, and then the hydroxyl value of the recovered polyol component is measured.

$$\text{Polyol equivalent} = \text{Molecular weight of KOH} \times 1{,}000/\text{Hydroxyl value of Polyol (mgKOH/g)} \quad (1)$$

When a foam urethane resin having the polyol equivalent of 230 or more to 1500 or less is used as the thermosetting resin forming the core layer, the density of 0.25 g/cm$^3$ or more to 0.6 g/cm$^3$ is of preferable.

On the other hand, when a foam urethane resin having the density of 0.3 g/cm$^3$ or more and the polyol equivalent of 1,500 or less is used as the thermosetting resin forming the core layer, the polyol equivalent of 110 or more to 1,200 or less is of preferable.

With the polyol equivalent of less than 110, the resin in the core layer may become too rigid, so that there is the possibility that flexibility of the composite material itself may become insufficient. On the other hand, with the polyol equivalent of more than 1,500, the resin in the core layer may become too soft, so that there is the possibility that the nailing performance of the composite material may become insufficient.

The density of polyurethane resin can be adjusted by adjusting a ratio between the fillers and the resin and foaming the polyurethane resin in between the fillers. The foaming is performed by use of foaming agent. The foaming agent may be selected properly for the resin used.

The foaming agents which may be used include, for example, physical foaming agents (volatile foaming agents), such as fleon, carbon deoxide and pentane, decomposition-type foaming agents, such as azo compound and sodium hydrogen carbonate, and reaction-type foaming agents, such as carbon dioxide produced by reaction of isocyanate and water.

For polyurethane, carbon dioxide produced by reaction of isocyanate and water should preferably be used because fleon can deplete the ozone layer. Also, the foaming agent should be previously mixed with the resin.

In the composite material of claim 10, the flexibility can be calculated from the following equation (2), using the deflection at a center of span=$\Delta y$, which corresponds to a permissible capacity at rated load center distance in the evaluation of the bending strength. The bending strength is measured in accordance with the method prescribed by JIS Z 2101.

$$\text{Deflection (\%)} = 6 \times (\text{thickness of a test piece}) \times \Delta y/(\text{span})^2 \times 100 \quad (2)$$

The measurement may be made of the physical properties by cutting out the core layer from the composite material or by producing the core layer having the same construction.

The composite material is bent in the direction vertical to the longitudinal direction of the test piece. The relation between the deflection and the bending stress is shown in a graph plotting the deflection in abscissa and the bending stress in ordinate.

In the composite material of claims 10 through 13, the singular point means a non-differentiable bent back point, a point of inflection at which a curved line changes from concave to convex or conversely, and the like.

In the composite materials of claims 10 and 11, the core layer has deflection of 0.8% or less, or preferably 0.7% or less, at the singular point, as in the composite material of claim 12. The reason is that with the deflection of the core layer of more than 0.8% at the singular point, the composite material, when bent or compressed, may be broken before the fillers are brought into contact with each other, so that there is the possibility of providing reduced strength.

In the composite materials of claims 10 through 12, it is preferable that the core layer has the bending modulus of 800 MPa or more, or preferably 950 MPa, when further deflected from deflection at the singular point, as in the composite material of claim 13. The reason is that the bending modulus of less than 800 MPa may reduce the effect that the fillers in the core layer are brought into contact to each other when the composite material is bent or compressed, so that there is the possibility of providing reduced strength.

In the case of the singular point being the bent back point, the bending modulus is the slope of the tangent line found from the large deflection direction.

In the composite materials of claims 10 through 13, either thermosetting resin which can be set under heat or at room temperature or thermoplastic resin which can be plasticized under heat may be used as the synthetic resin used for the core layer.

The thermosetting resins which may be used include the resins which are in liquid form or powder form before reaction and are of foamable, including polyurethane resin, phenol resin, unsaturated polyester, diallyl phthalate resin, vinyl ester resin, epoxy resin, urea resin, melamine resin, polyimide resin, polyamide-imide resin, acrylic resin, natural rubber, and synthetic rubber. These may be used in combination of two or more.

On the other hand, the thermoplastic resins which may be used include polystyrene, syndiotactic polystyrene, high-density polyethylene, low-density polyethylene, linear low-density polyethylene, polypropylene, rigid polyvinyl chloride, acrylic resin, ABS resin, aliphatic polyamide resin, polyethylene terephthalate, polybutylene terephthalate, polyoxymethylene, polycarbonate, polyarylate, polysulfone, polyether sulfone, polyether ether ketone, and polyphenylene sulfide, or copolymer thereof and blend thereof. Also, these may be of foamable. Further, the thermosetting resin and thermoplastic resin may be used in combination.

In the composite materials of claims 10 through 13, no particular limitation is imposed on the fillers. The fillers which may preferably used include, for example, amorphous granular materials, such as powder/granular rock, granular glass, calcium silicate, ground cement concrete, river sand, sea sand and silica sand, inorganic short fiber powders, such as wollastonite, inorganic powder/granular material having cells, such as expanded shale, pumice and glass foam, inorganic powder/granular materials having a relatively small particle size, such as pulverized vinyl chloride, pulverized fiber-reinforced resin, pulverized fiber-reinforced rigid foam urethane, calcium carbonate and fly ash and hollow particles thereof, sludge dry powder/granular material, mica, talc, clay, alumina, vermiculite, and glass short fibers. In addition, inorganic fibers, such as carbon fiber and boron fiber, organic short fibers, such as vinylon fiber, polyester fiber, aliphatic polyamide fiber and aromatic polyamide, and granulated materials thereof previously bonded by resin can be cited as the fillers. These may be used in combination of two or more. Further, the above-noted inorganic fillers as surface-treated by silane coupling agent may be used. When the polyurethane resin is used for the resin in the surface layer, silane coupling agent having an active hydrogen which reacts with an isocyanate group, such as a mercapto group, an amino group and an imino group, is preferably used.

The sludge dry powder/granular materials include high-temperature dry solids content produced from a sludge treatment facility. The pulverized fiber-reinforced resins include pulverized fiber-reinforced plastic (FRP) and pulverized fiber-reinforced rigid foam urethane. Further, fibrous ones include needle-like or shavings-like chips produced by scraping the fiber reinforced resin having unidirectionally aligned fibers in the fiber extending direction.

In the composite materials of claims 10 through 13, it is preferable that the core layer contains the filler having a weight 0.7 times or more the product (weight) of volume of the core layer and bulk density of the filler.

With the amount of filer of less than 0.7 times the product (weight) of volume of the core layer and bulk density of the filler, the thermosetting resin layer is allowed to exist between the fillers and accordingly the proportion of the fillers being not brought into direct contact with each other is increased. This makes it difficult to present the singular point and also may cause the compression strength and the nailing performance to be insufficient.

In the composite materials of claims 10 through 13, it is preferable that the average density of the core layer is in the same range as in the composite material of claim 1.

In the composite material of claim 10, either short fibers or long fibers may be used as the reinforced fiber used for the surface layer, though the long fibers are of preferable as in the composite material of claim 11. As far as the long fibers can reinforce the surface layer at least in the longitudinal direction thereof, any of mono-filament, fibril synthetics and weaving yarn, and unidirectional reinforcing one, such as roving, bidirectional reinforcing one, such as a mat, and tridirectional reinforcing one, such as sewed mats, may selectively be used. These may be used singularly or in combination of two or more. The same reinforced fibers as those in the composite materials of claims 10 and 11 may be used for the reinforced fibers of the surface layers of the composite materials of claims 12 and 13.

Either thermosetting resin which can be set under heat or at room temperature or thermoplastic resin which can be plasticized under heat may be used as the synthetic resin used for the surface layer.

The thermosetting resins which may be used include the resins which are in liquid form or powder form before reaction and are of foamable, including polyurethane resin, phenol resin, unsaturated polyester, diallyl phthalate resin, vinyl ester resin, epoxy resin, urea resin, melamine resin, polyimide resin, polyamide-imide resin, acrylic resin, natural rubber, and synthetic rubber. These may be used in combination of two or more.

On the other hand, the thermoplastic resins which may be used include polystyrene, syndiotactic polystyrene, high-density polyethylene, low-density polyethylene, linear low-density polyethylene, polypropylene, rigid polyvinyl chloride, acrylic resin, ABS resin, aliphatic polyamide resin, polyethylene terephthalate, polybutylene terephthalate, polyoxymethylene, polycarbonate, polyarylate, polysulfone, polyether sulfone, polyether ether ketone, and polyphenylene sulfide, or copolymer thereof and blend thereof. Also, these may be of foamable.

Further, of these thermoplastic resins, crystalline resins have preferably a melting point of 80° C. or more, or further preferably 120° C. or more. On the other hand, non-crystalline resins have preferably a glass transition point of 80° C. or more, or further preferably 100° C. or more. With the melting point and the glass transition point lower than these temperatures, the bending properties and the heat resisting properties may reduce.

Further, the thermosetting resin and the thermoplastic resin may be used in combination.

In the composite materials of claims 10 through 13, the foaming agents used may selectively be used in accordance with the types of resins. For example, physical foaming agents, such as fleon, carbon deoxide and pentane, decomposition-type foaming agents, such as azo compound and sodium hydrogen carbonate, and reaction-type foaming agents, such as carbon dioxide produced by reaction of isocyanate and water can be cited.

For example, when polyurethane is used as the resin, carbon dioxide produced by reaction of isocyanate and water should preferably be used because fleon can deplete the ozone layer. These may be used singularly or in combination of two or more. Also, the foaming agent should preferably be previously mixed with the resin.

In the composite materials of claims 10 through 13, it is preferable that the density of the surface layer is in the same range as in the composite material of claim 1, though no particular limitation is imposed thereon.

In the composite materials of claims 14 and 15, the same surface layer as those in the composite materials of claims 1 through 13 may be used.

When the composite material of the present invention is used for synthetic cross ties, the long fibers extending parallel to the longitudinal direction of the surface layer are preferably used.

In the composite materials of claims 14 and 15, it is preferable that the core layer forming material layers on the compression side thereof on which they are compressed when bent in the thickness direction are so constituted that they contain the fillers having a weight 0.7 times or more the product of volume of the core layer forming material layers and bulk density of the fillers so that the fillers in the core layer forming material layers, when compressed, can be brought into contact with each other to provide high elasticity and high strength, while also the core layer forming material layers on the tension side are so constituted that they are formed of the foam polyurethane resin having the polyol equivalent of 230 or more to 1,500 or less or the foam polyurethane resin having the density of 0.3 g/cm$^3$ or more and the polyol equivalent of 1,500 or less so that they can follow the expansion resulting from the deflection.

Also, it is preferable that the core layer forming material layers on the tension side thereof contain elastic members, such as rubber chips or springs, therein. The elastic members contained can provide vibration absorption to the composite material, while maintaining the high bending modulus by the surface layer and the core layer forming material layers on the compression side.

In the composite material of claim 15, the same as those of the surface layers of the composite materials of claims 1 through 13 may be used as the core layer forming material layer (hereinafter, it is referred to as "the intermediate fiber reinforced layer") which is interposed between the core layer forming layer comprising filler and synthetic resin (hereinafter it is referred to as "the filler containing layer") and the filler containing layer and is formed of foam thermosetting resin reinforced by the long fibers extending parallel in the longitudinal direction.

In the composite materials of claims 14 and 15, it is necessary that the core layer forming material layers bordering on each other are bonded together. If those layers are not bonded adequately, there is the possibility that the peel may be caused in the interface therebetween to cause the destruction of the entire composite material.

While no particular limitation is imposed on the bonding method, the bonding methods include, for example, the method of simultaneously molding the mutually bordering core layer forming material layers, the method of adhesive bonding the molded core layer material layers to each other by use of epoxy adhesive or urethane adhesive and the method of molding additional core layer forming material layer on the molded core layer forming material layer.

In the composite material of claim 16, it is necessary that the core layer and the surface layer have the relation that satisfies the equations of $CSa \geq \frac{1}{2} \times CSb$, $Ea < Eb$, and $ESa \geq \frac{1}{2} \times ESb$ (where CSa represents yield strain in compression of the core layer; CSb represents yield strain in compression load of the surface layer; Ea represents a tension elasticity modulus of the core layer; Eb represents a tension elasticity modulus of the surface layer; ESa represents tensile yield strain of the core layer; and ESb represents yield strain in tension of the surface layer). The reason is that if that relation is not satisfied, the performance (bending) of the fiber reinforced surface layer is not brought out, so that the composite material is not allowed to have the performance (bending) equivalent to or more than the material comprising only the thermosetting resin reinforced by the long fibers extending parallel in the longitudinal direction as in the surface layer or the thermosetting resin including the lightweight fillers reinforced by the long fibers extending parallel in the longitudinal direction. Specifically, as shown in FIG. 11, even when the core layer is on the side (upper side in FIG. 11) on which compression is generated by a load applied to cause the longitudinal bending along the fiber extending direction of the surface layer, if the relation of $CSa \geq \frac{1}{2} \times CSb$ is satisfied, the compression strength is improved. Also, even when the surface layer is on the side (lower side in FIG. 11) on which tension force is generated, if the relation of $Ea < Eb$ and $ESa \geq \frac{1}{2} \times ESb$ is satisfied, the improvement of the bending strength can be expected.

In the composite material of claim 16, it is preferable that it follows that $0.005 \leq CSa$, $50 \text{ MPa} \leq Ea$, $0.005 \leq ESa$, $0.01 \leq CSb$, $5,000 \text{ MPa} \leq Eb \leq 18,000 \text{ MPa}$, and $0.01 \leq ESb$, as in the composite material of claim 17. The reason is as follows.

In the core layer, the yield strain in compression CSa of 0.005 or more can provide reinforced compression property of the surface layer. The tension elasticity modulus Ea of 50 or more and the tensile yield strain ESa of 0.005 or more can produce the effect of following the deflection of the surface layer, to produce the composite material having performance (bending) equivalent to that of a single material of the surface layer and durability against a repeated load equivalent to that of the single material of the surface layer.

In the composite material of claims 16 and 17, it is preferable that the compression modulus of elasticity Ca of the core layer in the longitudinal direction is 300 MPa or more to 12,000 MPa or less and the compression modulus of elasticity Cb of the surface layer is 2,000 MPa or more to 8,000 MPa or less, in that Ea and Eb are well balanced to further improve the durability.

Further, the composite material having the compression modulus of elasticity Cb of the surface layer of 2,000 MPa or more to 8,000 MPa or less, the Eb of 5,000 MPa or more to 18,000 MPa or less and the ESb of 0.01 or more can provide further sufficient strength as the structural member resembling the woods.

In the composite materials of claims 16 and 17, no particular limitation is imposed on the foam thermosetting resin forming the surface layer. For example, rigid or semi-rigid polyurethane foam, phenol foam, low-power foam polyester foam can be cited as those foam thermosetting resins, including the heat decomposable foaming agents, the solvent foaming agents, such as fleon, and the foam thermosetting resin liquids including those from which gas is formed as by-product in the reaction and curing.

Polyurethane foam, in particular, is preferably used in that it has a relatively high mechanical strength and can easily form closed cells, when foamed, and thus has excellent unabsorbent.

On the other hand, while no particular limitation is imposed on the elastic synthetic resin forming the surface layer, the elastic synthetic resins include a resin belonging to the category of rubber, such as elastomer, flexible PVC and plastic polyvinyl alcohol. Resins having comparatively low elasticity, such as Polyolefin resin and high-impact ABS, are also included, as far as they have a specified elasticity.

In the composite material of claims 16 and 17, the long fiber used in the surface layer is not limited to any particular configuration, as far as it has the capability as the reinforced fiber. The same long fibers as those used for the surface layers of claims 1 through 15 may be used.

While the percentage of the long fibers contained in the surface layer is not particularly limited, 5 volume % or more to 40 volume % or less is of preferable. A less than 5 volume % of long fibers produce no reinforcing effects such as the bending strength. On the other hand, an excess of 40 volume % of long fibers may produce a possible fracture running parallel to the fibers when the composite material is nailed.

In the composite materials of claims 16 and 17, no particular limitation is imposed on the core layer. While the core layer is in general formed by the mixture of the fillers in the synthetic resin, it may be formed by two or more filler containing layers being laminated as in claims 14 and 15 or by the intermediate finer-reinforced layer being interposed between the filler containing layer and the filler containing layer.

In the composite materials of claims 16 and 17, while no particular limitation is imposed on the synthetic resin which is a main component of the core layer or of the filler containing layer, the thermosetting resin or the thermoplastic resin may be used as that synthetic resin.

The thermosetting resins which may be used include the resins which are in liquid form or powder form before reaction and are of foamable, including, for example, polyurethane resin, phenol resin, unsaturated polyester resin, diallyl phthalate resin, vinyl ester resin, epoxy resin, urea resin, melamine resin, polyimide resin, polyamide-imide resin, acrylic resin, natural rubber, and synthetic rubber. These may be used in combination of two or more.

On the other hand, the thermoplastic resins which may be used include polystyrene, syndiotactic polystyrene, high-density polyethylene, low-density polyethylene, linear low-density polyethylene, polypropylene, rigid polyvinyl chloride, acrylic resin, ABS resin, aliphatic polyamide resin, polyethylene terephthalate, polybutylene terephthalate, polyoxymethylene, polycarbonate, polyarylate, polysulfone, polyether sulfone, polyether ether ketone, and polyphenylene sulfide, or copolymer thereof and blend thereof. Also, these may be of foamable.

Further, of these thermoplastic resins, crystalline resins have preferably a melting point of 80° C. or more, or further preferably 120° C. or more. On the other hand, non-crystalline resins have preferably a glass transition point of 80° C. or more, or further preferably 100° C. or more. With the melting point and the glass transition point lower than these temperatures, there is the possibility that the bending properties and the heat resisting properties may reduce.

Further, the thermosetting resin and the thermoplastic resin may be used in combination.

For use of the foamable synthetic resin, those having the closed cells are preferable to prevent water absorbing property.

The same fillers as those used for the core layer in the composite materials of claims 1 through 15 may be used.

The same as the one used in the surface layer may be used as the intermediate fiber-reinforced layer.

In the composite materials of claims 1 through 17, it is preferable that the core layer has a compression shear strength of 5 MPa or more, as in the composite material of claim 18. The reason is as follows.

If the compression shear strength DBa of the core layer is less than 5 MPa or more, then the composite material cannot be allowed to have the bending strength equivalent to the material comprising only the thermosetting resin reinforced by the long fibers extending parallel in the longitudinal direction as in the surface layer or the thermosetting resin including the lightweight fillers reinforced by the long fibers extending parallel in the longitudinal direction. As a result, there is the possibility that the shear failure may be caused by the bending.

To obtain the compression shear strength DBa of the core layer of 5 MPa or more, it is preferable to treat the fillers with silane coupling agent or add the short fibers, pulverized fiber reinforced plastics, pulverized fiber reinforced rigid foam urethane, or fibrous ones including needle-like or shavings-like chips produced by scraping the fiber reinforced resin having unidirectionally aligned fibers in the fiber extending direction.

When the inorganic filler is used, the specific gravity of 0.5 or more is of preferable. Preferably, the inorganic filler having the specific gravity of 0.5–1.5 in all fillers is 50 volume % or less of the total core layer.

Further, in the composite materials of claims 16 through 18, in the case of possible occurrence of friction shearing in the surface, it is preferable that at least two longitudinal surfaces of the core layer are surrounded by the surface layer and/or the volume of the core layer is 50% or more to less than 65% of the total volume of the composite material. The composite material thus constituted can provide an improved bending strength, as compared with the one comprising the single material of the surface layer, and is of advantageous in reduction of the material cost.

In the composite materials of claims 1 through 18, no particular limitation is imposed on the production method. The composite material may be produced by either a batch process or a continuous process.

For reference's sake, an example of the batch production process is the process disclosed, for example, by Japanese Laid-open Patent Publication No. Hei 5-138797, in which after material preformed to form the core layer and material preformed to form the surface layer are preformed and then are set in casting molds, a mixture of the long fibers and the thermosetting resin, or a mixture of the filler and the thermosetting resin, or molding material thereof, which is to form the surface layer or the core layer, is filled in a casting mold before the preformed material is cured, and then the thermosetting resin is set by heating.

On the other hand, an example of the continuous process is as follows. A number of long fibers to be the reinforced fibers are aligned parallel with predetermined interval while they are traveled in one direction. Then, a foam thermosetting resin liquid is sprayed from over the group of long fibers as aligned parallel on the travelling way. Thereafter, the foam thermosetting resin liquid thus sprayed is impregnated in between the fibers forming the respective long fibers.

Then, an extrusion shaping die is placed to confront a center part of the group of long fibers impregnated with the foam thermosetting resin liquid, and the mixture of the filler and thermosetting resin to form the core layer is shaped to enclose the core layer by the group of long fibers while it is continuously extruded from the extrusion shaping die. Thereafter, they are continuously fed into a cylindrical molding passage to thermally set the foam thermosetting resin liquid in the molding passage, so as to form the core layer and the surface layer simultaneously.

As an alternative method thereto, the following method may by taken. The mixture of the filler and foam thermosetting resin to form the core layer is fed in between the groups of two-tiered long fibers impregnated with the foam thermosetting resin liquid and then is pressed by endless belts and the like to be shaped into a specified section form enclosed by the group of long fibers. Thereafter, the layer thus shaped is continuously fed in the uncured condition or after foamed and thermally set in the cylindrical molding passage. It is then continuously fed into the cylindrical molding passage as it stands or after its surface is ground, for example, by sanding, so that the foam thermosetting resin liquid is foamed and thermally set in the molding passage, so as to form the core layer and the surface layer simultaneously or sequentially.

In the composite material of claim 19, the same synthetic resin, foam synthetic resin, filler and long fiber as those used in claims 1 through 18 may be used for the core layer and the surface layer.

In the composite material in claim 19, no particular limitation is imposed on the non-foam thermosetting resin and low-power foam resin used for the intermediate layer, as far as they have the adhesion properties for allowing the surface layer and the core layer to adhere to each other. For example, polyurethane resin, epoxy resin, phenol resin, unsaturated polyester resin, urea resin, melamine resin, polyimide resin, polyamide-imide resin, acrylic resin, natural rubber, and synthetic rubber can be cited as the examples. If necessary, catalyst, foam stabilizer, foam assistant, filler, reinforcing short fiber, coloring agent, ultraviolet absorbent, antioxidant, crosslinking agent, stabilization agent, plasticizer, fire retardant, etc. may be added (always excepting foaming agent). For reference's purpose, in the case where polyurethane resins are used for the surface layer and the core layer, the same polyurethane resin should preferably be used for obtaining high adhesion property.

In use of the polyurethane resin, even if no foaming agent such as water is added, the polyurethane resin reacts with moisture in the air or moisture from the surface layer or core layer to form some foaming, but such degree of foaming is of negligible.

Further, the intermediate layer is formed between the core layer and the surface layer in order to integrate the core layer and the surface layer. No particular limitation is imposed on the thickness of the intermediate layer. If improvement is desired of the physical properties, such as the bending elasticity and the unnailing strength, then the non-foam thermosetting resin or low density foam resin of high elasticity modulus may be formed on the core layer to a larger thickness.

In the composite material of claim 20, the intermediate layer provided between the surface layer and the core layer is limited to 6.0 MPa or more in the compression shear strength when compressive force is applied to the composite material in a direction parallel to the fiber extending direction of the long fibers of the surface layer. Preferably, the intermediate layer has the compression shear strength of 7.0 MPa or more, or further preferably 7.5 MPa or more. The compression shear strength can be measured in accordance with the shearing test method prescribed by JIS Z 2101.

The reason why the shear strength of the intermediate layer with respect to the fiber extending direction of the long fibers of the surface layer is limited to 6.0 MPa or more is as follows. With the shear strength of the intermediate layer of less than 6 MPa, the durability against the repeated bending is reduced, which tends to destruction in the intermediate layer in the form of destruction. The destruction of the intermediate layer in the form of destruction diffuses progressively over the destruction surface since the point of time of destruction, and the reduction of strength makes rapid progress. As a result of this, this composite material can no longer be used for e.g. structural material and cross ties which require high elasticity, bending strength and durability against the repeated fatigue.

No particular limitation is imposed on the method of providing the shear strength of the intermediate layer of 6 MPa or more. For example, the method of interposing a high-strength and high-elasticity resin, such as epoxy resin, between the surface layer and the core layer; the method of making the resin density of the intermediate layer 1.1 times or more of the resin density of the surface layer and core layer when the shear strength of the surface layer with respect to the fiber extending direction of the long fibers and the shear strength of the core layer are 6 MPa or more; and the method of arranging a resin impregnated sheet-like material in the intermediate layer, as in the composite material of claim 21, can be cited as the examples.

The methods of making the density of the resin between the surface layer and the core layer higher than the density of resin of the surface layer and core layer include, for example, the method of applying epoxy resin or foam urethane resin or non-foam resin to the surface of the core layer or the intermediate layer when the multi-layered material is produced.

In the composite material of claim 21, the resin impregnated sheet-like material is the one that is impregnated with non-foam thermosetting resin or low-power foam resin and is used for the convenience sake to provide the intermediate layer between the core layer and the surface layer. No particular limitation is imposed on the resin impregnated sheet-like material, as far as it can be impregnated with non-foam thermosetting resin or low-power foam resin. For enhancing high strength of the intermediate layer in itself, a high strength sheet-like material may be used.

No particular limitation is imposed on the resin impregnated sheet-like material, as far as it can be impregnated with non-foam thermosetting resin liquid or low-density foam resin liquid. The resin impregnated sheet-like materials which may be used include, for example, non-woven fabric comprising inorganic glass fibers or synthetic resin fibers (e.g. polyester non-woven fabric (SUPAN BONDO E 1050 available from ASAHI CHEMICAL INDUSTRIAL CO., LTD. and vinylon non-woven fabric (e.g. BINIRON SUPAN REESU available from KURARAY CO., LTD.) and woven fabric. In addition, a porous sheet, having a number of holes, of a synthetic resin sheet, paper and metal fiber cloth may be used.

When the shear strength of the core layer is 6 MPa or the shear strength of the surface layer is 6 MPa with respect to the fiber extending direction, the resin impregnated sheet-like material can allow the intermediate layer to be 6 MPa or more in the compression shear strength with respect to the direction parallel to the fiber extending direction by the density of the resin between the surface layer and the resin impregnated sheet-like material and the density of the resin between the core layer and the resin impregnated sheet-like material being made to be 1.1 times or more of the density of the resin of the core layer and surface layer.

When polyurethane resin is used as the resin of the core layer and surface layer and the intermediate layer is interposed between the core layer and the surface layer, the rein impregnated sheet-like material, of which raw material has a chemical/physical affinity for the resin of the core layer and surface layer, such as vinylon fiber or glass fiber subjected to the silane coupling treatment, and has excellent adhesion properties, can allow the density of the resin between the surface layer and the sheet-like material and the density of the resin between the core layer and the sheet-like material to be 1.05 times or more of the density of resin of the core layer and surface layer, for example when the shear strength of the core layer is 6 MPa or the shear strength of the surface layer is 6 MPa with respect to the fiber extending direction.

In the composite materials of claims 1 through 7 and claims 9 through 21, it is preferable that the foam polyurethane resin is used as the synthetic resin of the core layer and the synthetic resin of the surface layer, as in the composite material of claim 22.

The reason why the foam polyurethane resin is used for the core layer is that it has a relatively high mechanical strength and is capable to form closed cells easily when foamed, and excellent unabsorbent.

The foam polyurethane resins which may widely be used include known foam polyurethane resins obtained by the reaction with polyol and polyisocyanate.

The polyols, having at least two hydroxyl groups at the molecular end thereof, include, for example, polyether polyol, such as polypropylene oxide, polyethylene oxide and polytetramethylene glycol, and copolymers thereof, polyester polyols, such as polycondensate of aliphatic dicarboxylic acid, such as adipic acid, and glycol having not more than 12 carbons, such as ethylene glycol, propylene glycol, butylene glycol and hexamethylene glycol, polyester polyol which is polycondensate of hydroxycarboxylic acid, such as poly $\epsilon$-caprolactone, and copolymer thereof, and polymer polyols which are graft copolymers of the polyols and polymer of monomer having vinyl group. These may be used singularly or in combination of two or more. The polyisocyanates which may be used have at least two isocyanate groups and include, for example, hydrogenated materials of 4,4'-methylene-diphenyl-diisocyanate, 2,4-tolylene diisocyanate, 2,6-tolylene diisocyanate, isophorone diisocyanate, hexamethylene diisocyanate, and 4,4'-methylene-diphenyl-diisocyanate, apocytes thereof, and apocytes of isomers thereof. These may be used singularly or in combination of two or more. In terms of safety, reactivity and convenience in handling, the mixture of 4,4'-methylene-diphenyl-diisocyanate and apocyte of isomer thereof (hereinafter it is referred to as "the polymeric MDI") is of preferable.

Examples of foaming agents used in the reaction are heat decomposable foaming agents, pneumatogen, such as fleon, and water. Further, by-products, such as decomposed gas, produced in the reaction of the heat decomposable foaming agents may be used. Since fleon can deplete the ozone layer, carbon dioxide produced by reaction of isocyanate and water should preferably be used. Also, the foaming agent should be previously mixed with the resin.

If necessary, catalyst, foam stabilizer, foam assistant, filler, reinforcing short fiber, coloring agent, ultraviolet absorbent, antioxidant, crosslinking agent, stabilization agent, plasticizer, fire retardant, etc. may be added to the foam urethane resin.

While no particular limitation is imposed on the catalyst, for example organotin catalyst such as dibutyltin dilaurate, amine catalyst, and temperature sensitive catalyst may be used.

The composite materials of claims 19 through 22 may be produced by either a batch process or a continuous process.

Preferably, the curing timing of the respective layers should be in most possible exact with each other. This seems to be because this can provide increased bonding force to contribute to improvement of interfacial strength if chemical bonds are formed between respective layers.

For reference's sake, reference is given to the batch production. For example, material preformed to form the core layer and material preformed to form the surface layer are preformed, first, and then are set in casting molds. In this process, the resin impregnated sheet-like material in which non-foam thermosetting resin was impregnated in advance is rested on a surface of the thus-set preformed material on the side thereof on which the core layer and the surface layer are laminated. Before the preformed material is cured, the mixture of long fiber and foam synthetic resin which is to form the surface layer, or the mixture of filler and synthetic resin which is to form the core layer, or an additional preformed material which is to form the surface layer or the core layer, is filled in a casting mold and then the synthetic resin of the core layer and the surface layer and the non-foam thermosetting resin is cured by heating.

Referring now to the continuous process, for example, a number of long fibers which are to be the reinforced fibers are aligned parallel with predetermined interval while they are traveled in one direction in two vertical levels. Then, a foam polyurethane resin liquid is sprayed from over the groups of long fibers which were aligned parallel in two vertical levels on the travelling way, so that the sprayed foam polyurethane resin liquid is impregnated in between the fibers forming the respective long fibers.

Further, in the state in which the resin impregnated sheet-like material in which non-foam thermosetting resin liquid or low-power foam resin liquid was impregnated in advance is arranged between the groups of two-tiered long fibers impregnated with the foam thermosetting resin liquid, the mixture of the filler and foam thermosetting resin to form the core layer is fed into and shaped by endless belts and the like, so that they are shaped into a specified section form enclosed by the group of long fibers and then are continuously fed in the as-uncured condition. Thereafter, they are continuously fed into a cylindrical molding passage so that the foam thermosetting resin liquid can be foamed and thermally set in the molding passage, so as to form the core layer, the surface layer and the intermediate layer simultaneously.

The composite material of claim 23 has a total thickness of 100 mm or more and a ratio between a thickness of the core layer and a sum total of thickness of the surface layer covering the core layer in the thickness direction is within the range of 9/1 to 1/1. The reason for this requirement is that with the ratio of more than 9/1, the bending strength becomes insufficient, while on the other hand, with the ratio of less than 1/1, there is the possibility that either of the compression strength and the nail holding performance resulting from the addition of the fillers may not be satisfied.

In the composite material of claim 24, the core layer has at least two core layer forming composition layers (A) comprising filler and synthetic resin and at least one core layer forming composition layer (B) comprising thermosetting resin reinforced by long fibers interposed between two core layer forming compositions (A),(A) of the at least two core layer forming composition layers (A) and extending parallel in a longitudinal direction of the composite material, and a ratio between a sum total of thickness of the core layer forming composition layer (A) and a sum total of thickness of the core layer forming composition layer (B) is within the range of 95/5 to 50/50. The reason for this requirement is that with the ratio of more than 95/5, the nail holding performance of the core layer forming composition layer (B)

which is the intermediate fiber-reinforced layer is reduced, while on the other hand, with the ratio of less than 50/50, there is the possibility that compression elasticity limit may be reduced.

In the composite material of claim 25, the surface layer is laminated on the core layer to cover at least two surfaces of the core layer with respect to a thickness direction thereof; the composite material has a total thickness of 100 mm or more with respect to a thickness direction thereof; and a thickness of the surface layer on the side thereof on which a pulling force is exerted when the composite material is bent in the thickness direction is 5% or more to 25% or less of the total thickness and the thickness of the surface layer on the side thereof on which a compressive force is exerted is 1.5% or more to 15% or less of the total thickness. The reason is as follows.

When the thickness of the surface layer on the side thereof on which a pulling force is exerted is too small, a sufficient bending strength may not be presented. On the other hand, when the thickness of the surface layer on the side thereof on which the pulling is exerted is too large, the effect of reduction of material cost resulting from the provision of the core layer may be reduced. When the thickness of the surface layer on the side thereof on which a compressive force is exerted is too small, the core layer may be buckled due to a deformation, thereby, a sufficient bending strength may not be presented. On the other hand, when the thickness of the surface layer on the side thereof on which the compressive force is exerted is too large, the effect of reduction of material cost resulting from the provision of the core layer may be reduced.

In the composite material of claim 26, the surface layer surrounds four surfaces of the core layer and constitutes 10 volume % or more to 65 volume % or less of the total of the composite material. The reason for this requirement is that with less than 10 volume %, the bending strength becomes insufficient, while on the other hand, with more than 65 volume %, there is the possibility that either of the compression strength and the nail holding performance resulting from the addition of the fillers may not be satisfied.

The composite material of the present invention is suitable for structural material. It can suitably be used as a substitution of wood and also for intended uses for weight reduction of concrete products, such as lids used in a water treatment plant, pressure bearing boards used in the slop or equivalent places, sheathings for use in the Shield Earth Retaining Wall method (hereinafter it is referred to as "the SEW construction method") and cross ties as cited in claim 27.

It is to be noted that the SEW construction method is the construction method in which a high strength and high durability wall is incorporated in an earth retaining wall at a part thereof through which a shield machine passes so that the shield machine can directly cut that part of the wall to travel through it from a starting point to a terminal end, without any need for the cutting of the wall circularly by humans and machines.

In the composite material and cross tie of the present invention, the surface layer and the core layer may be provided, at their exposed sides, with a decoration layer, a weatherproof layer, and a waterproof layer, if required.

While no particular limitation is imposed on the weatherproof layer, for example a coating film formed by the application of weatherproof paint can be cited as the weatherproof layer.

While no particular limitation is imposed on the waterproof layer, it may be formed of a waterproof sheet and a waterproof board, made of rubber, synthetic resin, metal sheet or combination thereof, and a coating film formed by the application of a non-immersible paint and the equivalent formed by the application or impregnation of water-repellent material of oily material such as paraffin and petroleum jelly.

While the composite material of the present invention has an excellent nail holing performance, the nail holding performance may be further enhanced by forming prepared holes in nailing points, inpouring adhesive in the prepared holes, and then striking the nails therein.

BEST MODE FOR CARRYING OUT THE INVENTION

The detailed description on the embodiments of the present invention will be given with reference to the accompanying drawings.

Figure 1:
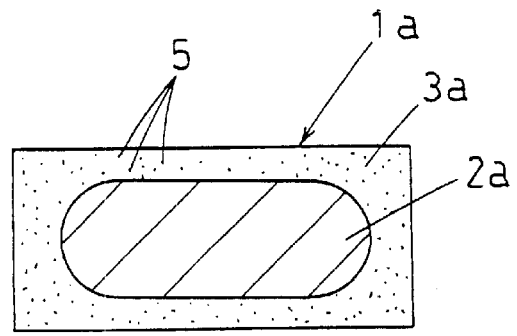
FIG. 1 shows a first embodiment of a composite material according to the present invention, showing a longitudinal sectional view thereof.

Referring to FIG. 1, there is shown the 1st embodiment of a composite material according to the present invention.

As shown in FIG. 1, the composite material 1a comprises a core layer 2a and a surface layer 3a.

The core layer 2a comprises filler 22 and thermosetting resin 21, contains the filler 22 having a weight 0.7 times or more the product of volume of the core layer and bulk density of the filler and has a density of 0.3 g/cm³ or more to 2.3 g/cm³ or less.

The filler 22 is formed of at least one powder/granular material selected from the group consisting of inorganic powder/granular material, sludge dry powder/granular material and pulverized fiber-reinforced resin.

Figure 2:
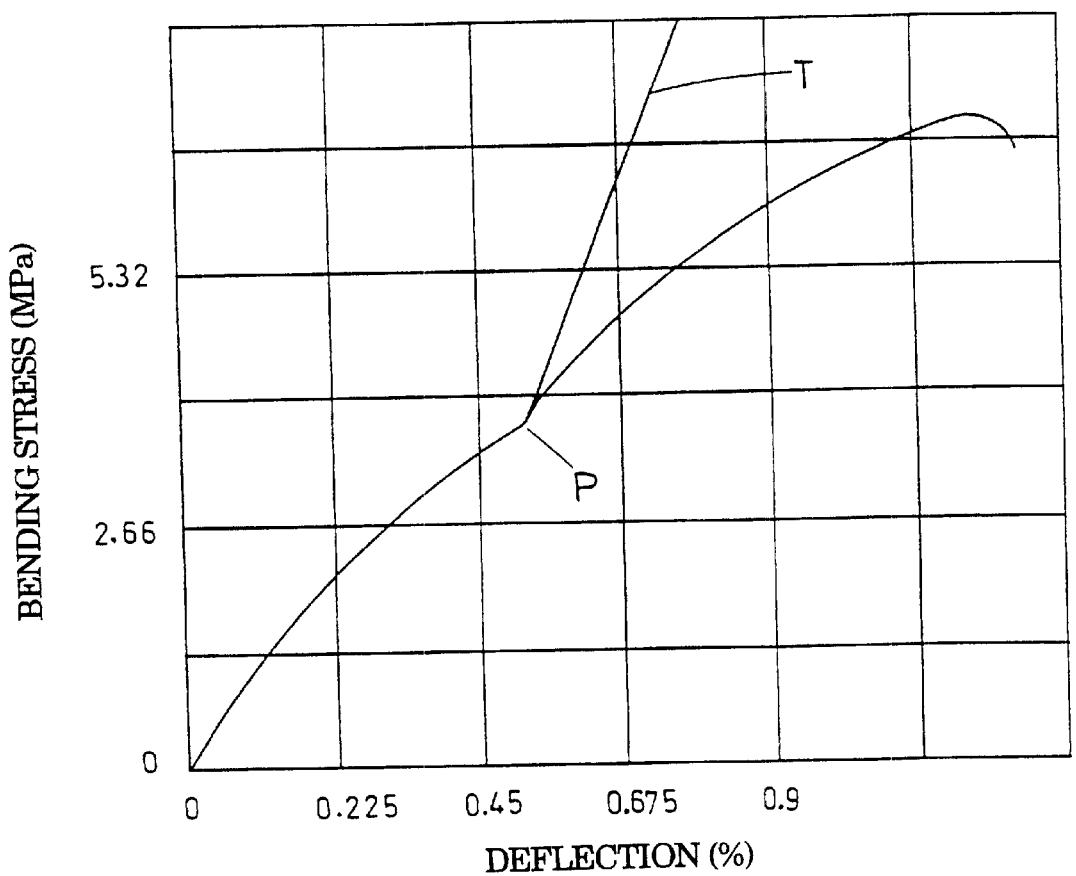
FIG. 2 is a variation curve of bending stress of the composite material of FIG. 1.

As shown in FIG. 2, when the bending stress of the core layer 2a that varies with variation of the deflection is plotted, a variation curve having a singular point P is plotted, at which point the slope of the tangent line T decreasing gradually from the point in time at which the bending is started increases again before becoming negative. The core layer 2a has the deflection of 0.8% or less at the singular point P and, besides, has the bending modulus of 800 MPa or more when deflected further from the deflection at the singular point.

The surface layer 3a is arranged to surround the core layer 2a from around it so as to be integral with the core layer 2a and is formed of foam thermosetting resin whose long fibers 5 are aligned in generally parallel in the longitudinal direction.

The surface layer 3a constitutes 10 volume % or more to less than 65 volume % of the total volume.

Next, the detailed description on the producing process of the composite material 1a using a production unit shown in FIG. 3 will be given.

Figure 3:
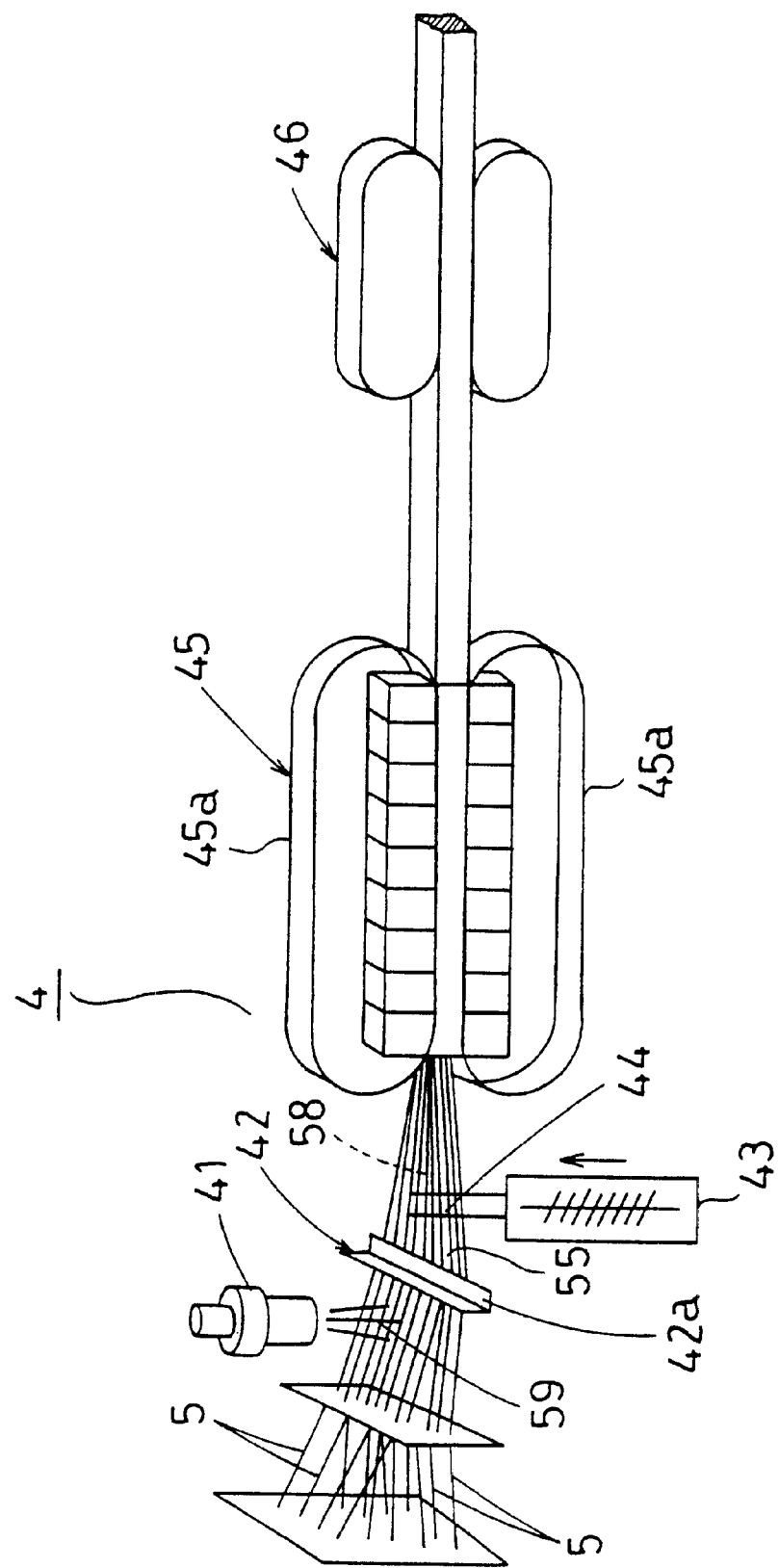
FIG. 3 is a schematic diagram schematically showing a production unit for the composite material of FIG. 1.

As shown in FIG. 3, the production unit 4 comprises a discharge machine 41, an impregnating device 42, a continuous kneader 43, a shaping die 44, a molding passage 45 and a take-off mechanism 46.

The discharge machine 41 is designed to continuously discharge foam thermosetting resin liquid 59 produced by the mixture of raw material of thermosetting resin fed from a raw material tank (not shown) and spray it over the long fibers 55 which are paralleled while passing through the molding passage 45 and are continuously taken off to the takeoff mechanism 46 side.

The impregnating device 42 is provided with an impregnating plate 42a and an impregnating base (not shown) to receive the impregnating plate 42a. The group of long fibers 55 over which the foam thermosetting resin liquid 59 was sprayed is kneaded between the impregnating base and the impregnating plate 42a so that the foam thermosetting resin liquid 59 can be uniformly impregnated in between the fibers.

The continuous kneader 43 is designed to mix the foam thermosetting resin liquid for forming the core layer 2a and the filler to thereby produce a mixed raw material and also continuously feed the mixed raw material to the shaping die 44.

The shaping die 44 is designed to continuously shape the mixed raw material fed from the continuous kneader 43 into a specified shape and also feed the shaped material to a center part of the group of long fibers 55 on the way between the impregnating device 42 and the molding passage 45 as a shaped material 58 for use in forming the core layer.

The molding passage 45 is formed by combining four endless belts 45a (only two of them are shown in the diagram) which are driven for rotation in the same direction by driving means and has a rectangular shape in section. It also has a heating device, though not shown, to foam the foam thermosetting resin liquid 59 impregnated in the long fibers 5 continuously fed into the molding passage 45 and the foam thermosetting resin liquid in the shaped material 58 and cure them, to thereby produce the composite material 1a having the core layer 2a and the surface layer 3a having a section form as shown in FIG. 1. The composite material thus produced is continuously fed through the molding passage.

The take-off mechanism 46 is designed to take off the composite material 1a at a regular speed.

In the composite material 1a thus produced, the surface layer 3a that is formed in the state in which the long fibers 5 are aligned parallel in the longitudinal direction in the thermosetting resin. Thus, the composite material is easily nailed by a nail and the like and also is excellent in bending strength exerted in the longitudinal direction.

Figure 4:
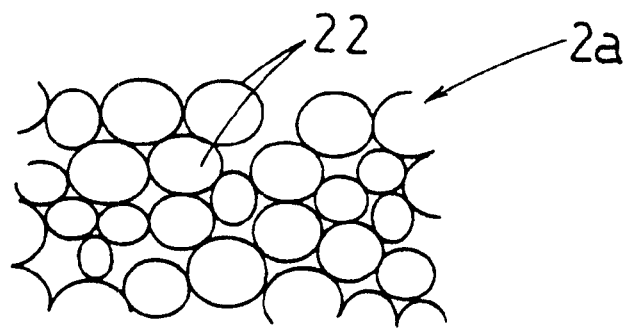
FIG. 4 is a schematic diagram of an enlarged sectional view of a core layer of the composite material of FIG. 1.

Also, since the core layer 2a comprises the filler 22 and the thermosetting resin 21 and since it contains the filler 22 having a weight 0.7 times or more the product of volume of the core layer and bulk density of the filler and has a density of 0.3 g/cm³ or more to 2.3 g/cm³ or less, the fillers 22 are adhesive bonded with each other through the thermosetting resin in the state in which the fillers are put in contact with each other, as shown in FIG. 4.

Therefore, the core layer 2a is small in deformation against compression and also is dependent on the surface layer 3a, so that it will never be below the compression proportional limit of the surface layer 3a. Accordingly, the composite material has excellent compression strength on the whole and also has improved unnailing performance by the filler 22 of the core layer 2a. In other words, since the filler 22 is densely packed, the resistance to the unnailing is increased by the filler 22 and the thermosetting resin 21 and thus the unnailing strength is improved.

Further, since inorganic powder/granular material, sludge dry powder/granular material and pulverized fiber-reinforced resin are used as the filler 22, the coefficient of thermal expansion of the filler is about 1/10 of that of the thermosetting resin. Due to this, the coefficient of thermal expansion of the core layer 2a comes near that of the surface layer 3a reinforced by the glass fibers. Consequently, even when environmental temperature varies largely, little deformation is produced in an interface between the surface layer and the core layer, thus providing a high reliability of long-term layer-to-layer adhesion properties.

In addition, since the surface layer 3a comprises foam thermosetting resin reinforced by the long fibers aligned parallel in the longitudinal direction and constitutes 10 volume % or more to less than 65 volume % of the total volume, the composite material has a sufficient property in bending strength and also is resistance to the crack or fracture when nailed.

Besides, the variation curve of the bending stress of the core layer 2a has the singular point P at which the slope of the tangent line decreasing gradually from the point in time at which the bending is started increases again before becoming negative and also the deflection of the core layer is 0.8% or less at the singular point P. Furthermore, the core layer has the bending modulus of 800 MPa or more when deflected further from the deflection at the singular point. Due to this, the bending strength is improved. The occurrence of the singular point provides the result that when the composite material is bent or compressed, the fillers are brought into full contact with each other to produce improved strength.

Figure 5:
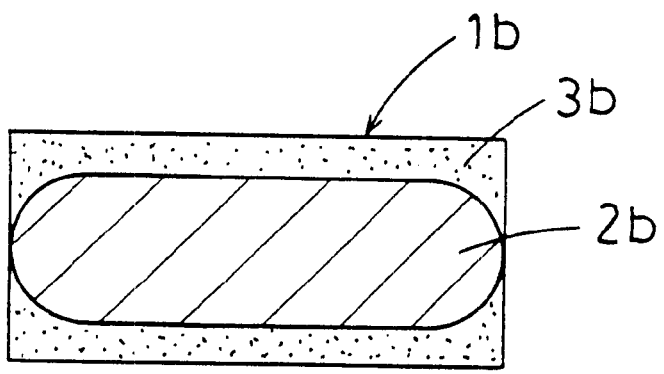
FIG. 5 shows a second embodiment of the composite material according to the present invention, showing a longitudinal sectional view thereof.

Referring to FIG. 5, there is shown the 2nd embodiment of the composite material according to the present invention.

As shown in FIG. 5, the composite material 1b is formed with a core layer 2b sandwiched between the surface layers 3b located on top and bottom surfaces of the core layer.

The core layer 2b is formed of filler contained in a proportion of excess of 50 volume % to 95 volume % or less, and foam polyurethane resin of polyol equivalent of not less than 230 to not more than 1,500 or foam polyurethane resin of density of not less than 0.3 g/cm$^3$ and polyol equivalent of not more than 1,500.

The surface layers 3b are formed of foam thermosetting resin reinforced by the long fibers aligned parallel in the longitudinal direction.

The composite material 1b is produced by the following processes: First, a mixture of the filler and the foam polyurethane resin liquid is filled in a casting mold to form it into a core layer shape. Then, prior to the curing of the shaped material, the shaped material is sandwiched in between a thermosetting resin foam sheet reinforced by fibers that become the surface layer and then is cured in this state in the casting mold by heating.

In this composite material 1b, since the core layer 2b includes the fillers contained in a proportion of excess of 50 volume % to 95 volume % or less, as mentioned above, the fillers 22 are adhesive bonded with each other via the foam polyurethane resin in the state in which the fillers are put in contact with each other, as is the case with the composite material 1a mentioned above.

Therefore, the core layer 2b is small in deformation against compression and also is dependent on the surface layer 3b, so that it will never be below the compression proportional limit of the surface layer 3b. Accordingly, the composite material has excellent compression strength on the whole and also has improved unnailing performance by the filler of the core layer 2b. In other words, since the filler 22 is densely packed, the resistance to the unnailing is increased by the filler and the foam polyurethane resin and thus the unnailing strength is increased.

Besides, since the foam polyurethane resin forming the core layer 2b has polyol equivalent of not less than 230 to not more than 1,500 or has a density of not less than 0.3 g/cm$^3$ and polyol equivalent of not more than 1,500, the flexibility is also improved.

Hence, when the composite material is used as the cross tie and the like, that will be able to easily absorb vibrations to reduce noise. In addition, since the core layer is resistant to destroying, if damage originates from deterioration, the damage will then be caused to the surface layer and thus will be easily detectable.

Further, specific gravity of the composite material produced can be easily adjusted by adjusting the specific gravity of fillers of the core layer, such that the composite material can be used for various uses ranging from weight saving use to weighted use.

Figure 6:
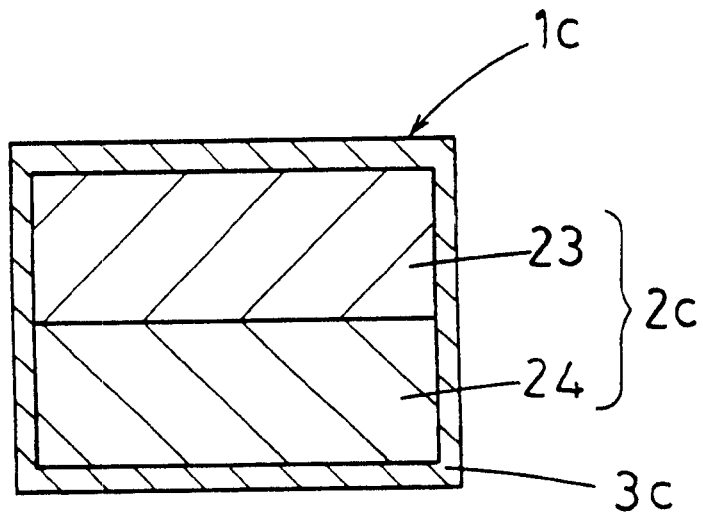
FIG. 6 shows a third embodiment of the composite material according to the present invention, showing a longitudinal sectional view thereof.

Referring to FIG. 6, there is shown the 3rd embodiment of the composite material of the present invention.

As shown in FIG. 6, the composite material 1c comprises a core layer 2c comprising two filler-containing layers 23, 24 as core layer forming compositions and a surface layer 3c arranged to surround the core layer 2c.

The filler-containing layers 23, 24 are formed of foam polyurethane resin of polyol equivalent of not less than 230 to not more than 1,500 or foam polyurethane resin of density of not less than 0.3 g/cm$^3$ and polyol equivalent of not more than 1,500, and material including the filler having a weight 0.7 times or more the product of volume of the filler-containing layers 23, 24 and bulk density of the filler.

The two filler-containing layers 23, 24 are different in compounding ratio of fillers from each other; are slightly different in physical properties from each other; and are adhesive bonded together in the interface therebetween.

The surface layer 3c is formed of foam thermosetting resin reinforced by the long fibers aligned parallel in the longitudinal direction.

In the composite material 1c, since the core layer 2c is formed of two filler-containing layers 23, 24 different in physical properties from each other, as mentioned above, the filler-containing layers 23, 24 and the surface layer 3c cooperate efficiently against the bending, to provide improved strength and flexibility of the composite material.

Figure 7:
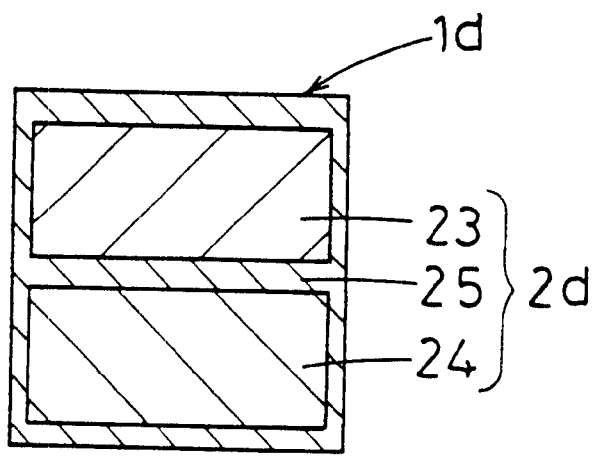
FIG. 7 shows a fourth embodiment of the composite material according to the present invention, showing a longitudinal sectional view thereof.

Referring to FIG. 7, there is shown the 4th embodiment of the composite material of the present invention.

As shown in FIG. 7, the composite material 1d is identical to the above-mentioned composite material 1c, except that a core layer 2d is formed of two filler-containing layers 23, 24 different in physical properties from each other and an intermediate fiber-reinforced layer 25.

The intermediate fiber-reinforced layer 25 is formed of foam thermosetting resin reinforced by the long fibers aligned parallel in the longitudinal direction, as is the case with the surface layer 3c, and is adhesive bonded to the upper and lower filler-containing layers 23, 24 to be integral therewith.

In this composite material 1d, since the intermediate fiber-reinforced layer 25 is provided between the filler-containing layer 23 and the filler-containing layer 24, as mentioned above, the nail struck can be bound by the long fibers of the intermediate fiber-reinforced layer 25 to provide an improved nail holding performance of the composite material.

Hence, the composite material can be used suitably for a cross tie (a railway sleeper, in particular), a pressure bearing board and a shield earth retaining wall method (SEW) which require high bending strength and bending modulus. Also, since the product size can be reduced for purposes not requiring high bending strength and bending modulus, cost reduction of material can be achieved.

Figure 8:
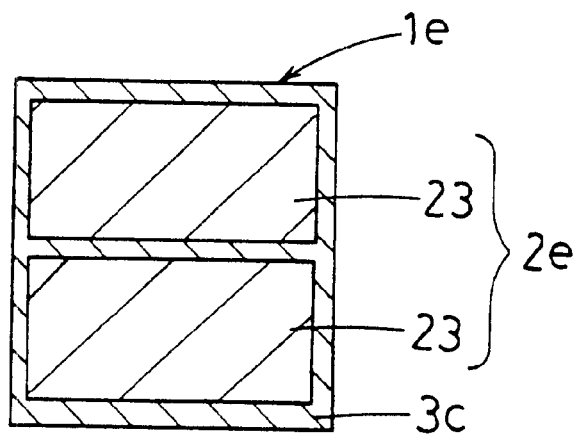
FIG. 8 shows a fifth embodiment of the composite material according to the present invention, showing a longitudinal sectional view thereof.

Referring to FIG. 8, there is shown the 5th embodiment of the composite material of the present invention.

As shown in FIG. 8, the composite material 1e is identical to the above-mentioned composite material 1d, except that a core layer 2e is formed of two filler-containing layers 23, 23 identical to each other and an intermediate fiber-reinforced layer 25.

Figure 9:
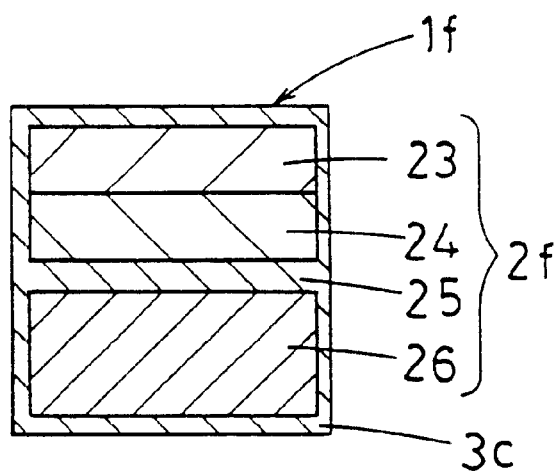
FIG. 9 shows a sixth embodiment of the composite material according to the present invention, showing a longitudinal sectional view thereof.

Referring to FIG. 9, there is shown the 6th embodiment of the composite material of the present invention.

As shown in FIG. 9, the composite material 1f is identical to the above-mentioned composite materials 1d, 1e, except that a core layer 2f is formed of three filler-containing layers 23, 24, 26 different in physical properties from each other and an intermediate fiber-reinforced layer 25.

Specifically, the intermediate fiber-reinforced layer 25 is provided between the filler-containing layer 24 and the fuler-containing layer 26 and the filler-containing layer 23 and the filler-containing layer 24 are directly adhesive bonded with each other.

Figure 10:
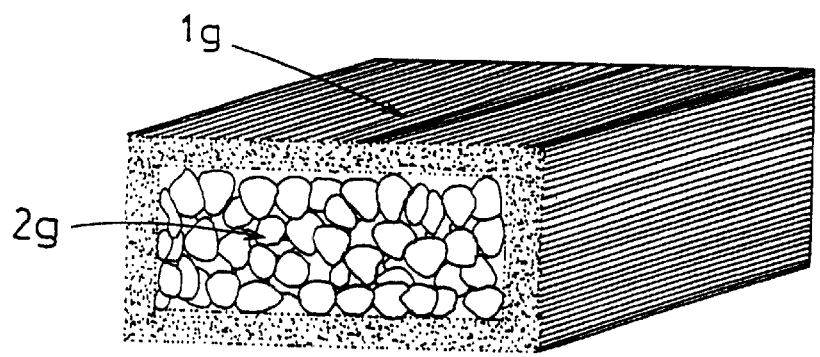
FIG. 10 shows a seventh embodiment of the composite material according to the present invention, schematically showing a perspective view thereof.
Figure 11:
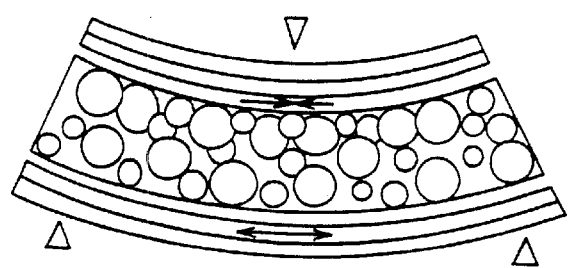
FIG. 11 is an illustration for explaining a developing mechanism of bending strength of the composite material.

Referring to FIG. 10, there is shown the 7th embodiment of the composite material of the present invention.

As shown in FIG. 10, the composite material 1g comprises a core layer 2g containing synthetic resin as the main component and a surface layer 3g which comprises foam thermosetting resin reinforced by long fibers aligned parallel in the longitudinal direction or elastic synthetic resin reinforced by long fibers aligned parallel in the longitudinal direction and which is arranged to surround the core layer 2g.

The core layer 2g and the surface layer 3g have the relation that satisfies the equations of $CSa \geq \frac{1}{2} \times CSb$, $Ea<Eb$, and $ESa \geq \frac{1}{2} \times ESb$ (where Ca represents a compression modulus of elasticity of the core layer in the longitudinal direction; Cb represents a compression modulus of elasticity of the surface layer in the longitudinal direction; CSa represents yield strain in compression of the core layer; CSb represents yield strain in compression of the surface layer; Ea represents a tension elasticity modulus of the core layer; Eb represents a tension elasticity modulus of the surface layer; ESa represents yield strain in tension of the core layer; and ESb represents yield strain in tension of the surface layer) and it follows from the equations that $300$ $MPa \leq Ca \leq 12,000$ MPa, $0.005 \leq CSa$, $50$ $MPa \leq Ea$, $0.005 \leq ESa$, $2,000$ $MPa \leq Cb \leq 8,000$ Mpa, $0.01 \leq CSb$, $5,000$ $MPa \leq Eb \leq 18,000$ MPa, and $0.01 \leq ESb$.

The core layer 2g contains the filler having a weight 0.7 times or more the product of volume of the core layer and bulk density of the filler and has a shear strength DBa of 5 MPa or more.

The composite material 1g thus constituted provides the results of suppressing destroy of the core layer and improving flexibility, in addition to bending strength, compression proportional limit, nailing property and unnailing property. Hence, when the composite material is used as the cross tie and the like, that will easily absorb vibrations to reduce noise.

Figure 12:
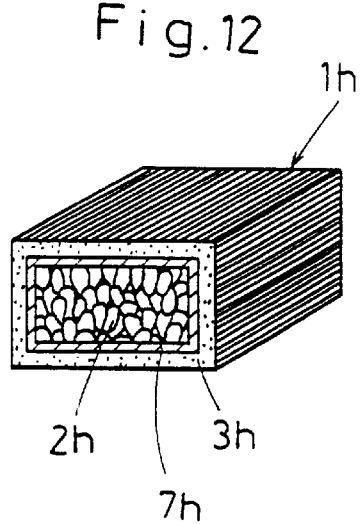
FIG. 12 is a perspective view of a eighth embodiment of the composite material according to the present invention.

Referring to FIG. 12, there is shown the 8th embodiment of a composite material according to the present invention.

As shown in FIG. 12, the composite material 1h comprises a core layer 2h, an intermediate layer 7h and a surface layer 3h and has a rectangular form in section.

The core layer 2h comprises filler and foam polyurethane resin, contains the filler having a weight 0.7 times or more the product of volume of the core layer and bulk density of the filler and has a density of 0.3 g/cm$^3$ or more to 2.3 g/cm$^3$ or less.

The filler is formed of at least one powder/granular material selected from the group consisting of inorganic powder/granular material, sludge dry powder/granular material and fiber reinforcing resin pulverized material.

The surface layer 3h is formed of foam polyurethane resin whose long fibers are aligned in generally parallel in the longitudinal direction.

The surface layer 3h constitutes 10 volume % or more to 65 volume % or less of the total volume.

The intermediate layer 7h is formed of polyurethane resin as non-foam thermosetting resin. The surface layer 3h and the core layer 2h are integrated through the intermediate layer 7h by adhesive bonding.

The intermediate layer 7h includes a resin impregnated sheet-like material, though not shown, and has a shear strength of 6 MPa or more when it is compressed in a direction parallel to the fiber extending direction of the long fibers 5 of the surface layer 3h.

Figure 13:
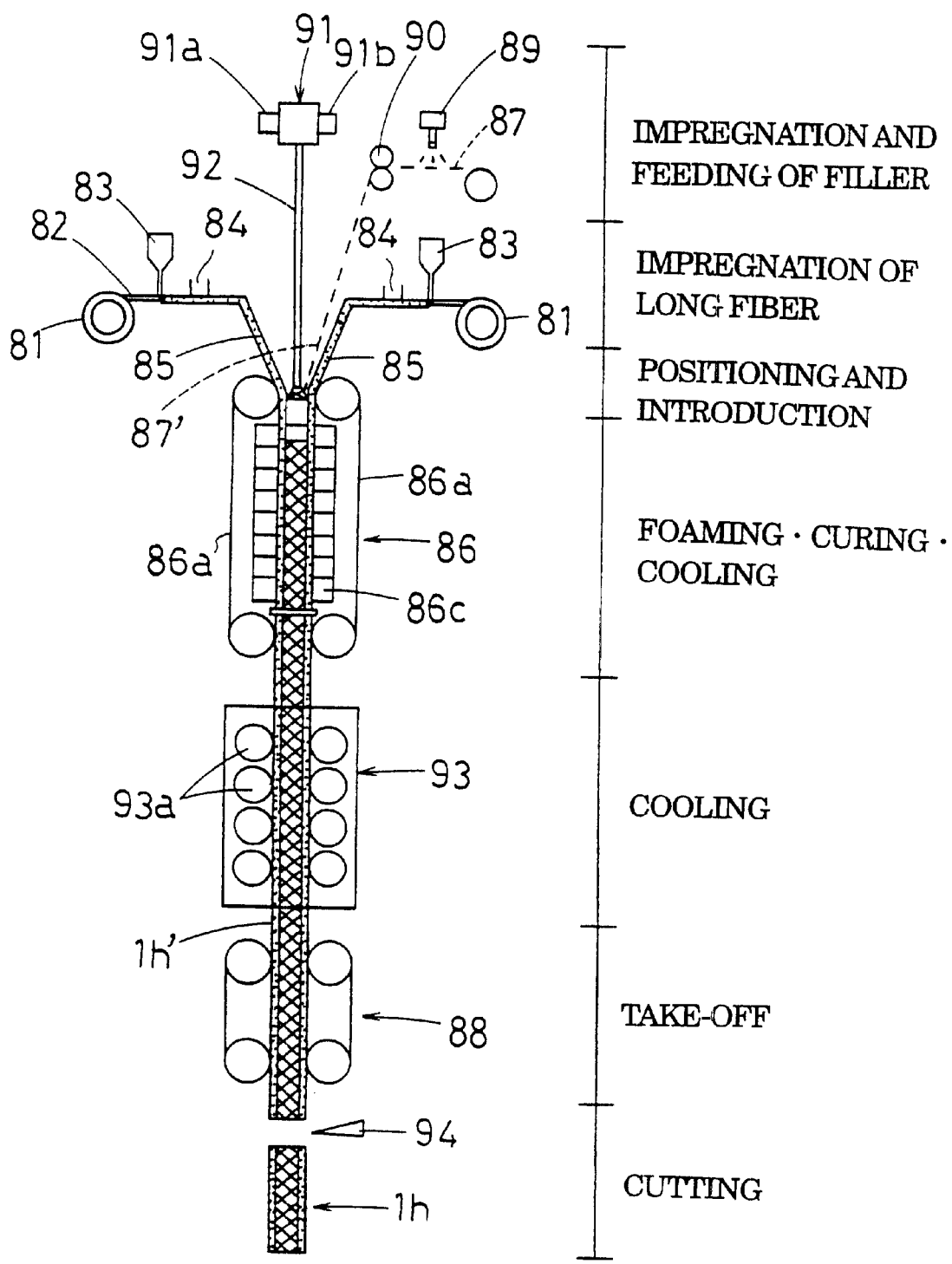
FIG. 13 is an illustration schematically showing a vertical production line for use in producing the composite material of FIG. 12.

Referring to FIG. 13, there is shown a vertical shaping line of one example of the production method of the composite material 1h.

With reference to FIG. 13, the production method will be described under the following respective processes.

(1) Feeding and Paralleling of Long fibers:

In FIG. 13, long fibers 81 are fed from straightening vanes (not shown) from four directions corresponding to the respective sides of the product obtained (only two directions are shown in the diagram), so that long fiber bundles 82 which are drawn with tension while being aligned generally parallel with given intervals are made to travel in one direction.

(2) Impregnation, Positioning and Introduction of Roving:

Thereafter, foam polyurethane resin in solution form is trickled down on the long fiber bundles 82 from foam polyurethane resin tanks 83 located over the long fiber bundles 82 in travel, for adhesion thereto. Then, the long fiber bundles 82 to which the foam polyurethane resin adhered are fed to impregnating plates 84. The impregnating plates 84 are moved in reciprocation in a direction orthogonal to the travelling direction of the long fiber bundles to knead the long fiber bundles 82, so as to impregnate the foam polyurethane resin in between the long fibers forming the long fiber bundles 82.

Then, the resin impregnated long fiber bundles 85 corresponding in position to the four sides are positioned in inlets of movable molds 86 on their respective sides.

Guides (not shown) may then be used for making change of or making fine adjustment of the travelling direction.

Then, the resin impregnated long fiber bundles 85 are each introduced into a movable molds 86 by a driving force applied from a take-off mechanism 88, while contacting with four sides of the movable mold 86. It is noted here that the movable mold 86 defines a closed space in which endless belts 86a are arranged in four directions (only two directions in the diagram).

(3) Introduction of Resin Impregnated Sheet-like Material:

Non-foam thermosetting resin liquid is trickled down on resin impregnated sheet-like material 87 from a mixing head 89, first, and then the resin impregnated sheet-like material 87 is allowed to pass through impregnating rolls 90 to impregnate the non-foam thermosetting resin in the sheet-like material 87. The resin impregnated sheet-like material 87' thus impregnated is introduced into the movable mold 86 so that it can be located between the core layer 2h and the surface layer 3h in the composite material 1h produced.

(4) Casting of Filler:

Then, foam polyurethane resin composition 92 in which fillers such as silica sand is added and mixed is cast and dropped from a mixing device 91 into a space surrounded by the long fiber bundles 85 which are positioned in the four sides of the interior of the movable mold 86 and are impregnated with the polyurethane resin liquid and the resin impregnated sheet-like material 87 which are positioned at the inside of the long fiber bundles 85 and are impregnated with the non-foam thermosetting resin. The mixing device 91 is provided with an inlet 91a for the foam polyurethane resin liquid, an inlet 91b form the filler, and a main body (a mixing portion).

(5) Shaping of Laminate:

The resin liquid containing therein the above-mentioned filler, the long fiber bundles 85 impregnated with the surrounding resin liquid, and the resin impregnated sheet-like material 87' impregnated with the non-foam thermosetting resin, such as non-foam polyurethane resin, are moved downward in synchronization with each other by the endless belts 86a forming the movable mold 86.

In the course of the movement, the filler containing resin, the long fiber bundles 85 impregnated with the surrounding resin liquid, and the resin impregnated sheet-like material 87 impregnated with the non-foam thermosetting resin are, first, subjected to heat from the endless belts 86a heated by a heating/cooling segment 86c to generate a foaming and curing reaction to thereby produce a fiber reinforced resin laminate 1h' in which the core layer 2h, the surface layer 3h and the intermediate layer 7h provided therebetween are generally formed. Then, the fiber reinforced resin laminate 1h' is cooled down by the endless belts 86a cooled by a lower heating/cooling segment 86c.

(6) Cooling:

Then, the multi-tiered formation is got out of the movable mold 86 and fed to a cooling device 93. The multi-tiered formation is fully cooled down by cooling rolls 93a in the cooling device 93.

(7) Cutting:

Thereafter, after having passed through the take-off mechanism 88, the fiber reinforced resin laminate is cut to a desired length with a cutting device 94 to obtain the composite material 1h.

In this composite material 1h, the surface layer 3h and the core layer 2h are integrated through the intermediate layer 7h by adhesive bonding, as aforementioned. Hence, this composite material can easily be nailed and has an excellent bending strength in the longitudinal direction, as is the case with the composite material 1a, as well as can suitably be used for structural material for use in e.g. a shield-use take-off/accession coffering wall for use in the SEW construction method.

The composite material like the composite material disclosed, for example, by Japanese Laid-open Patent Publication No. Hei 5-138797, wherein the surface layers comprising thermosetting resin foam in which reinforced long fibers are paralleled in the longitudinal direction to be dispersed in generally parallel are laminated on surfaces of the core layer comprising the thermosetting resin foam to which the filler was added, can be made with a large thickness with comparative ease. However, since both the core layer and the surface layer comprise the thermosetting resin foam, the interfacial strength is so low for the application to the SEW construction method that peeling can easily be caused in the interface and, for this reason, it was practically difficult for the composite material to be used for that construction method.

In contrast to this, in the composite material 1h, the surface layer 3h and the core layer 2h are firmly integrated with each other through the intermediate layer 7h by adhesive bonding, so that the problem of the peeling being caused in the interface is prevented. In other words, since the non-foam thermosetting resin layer exists in the interface between the core layer and the surface layer, the composite material is of excellent in adhesion strength in the interface, in other words, in interfacial strength.

This is presumably because the adhesion strength in the interface, in other words, the chemical bonding per unit area and the degree of anchor bonding in the interface are higher than those in the interface of the non-foam layers being bonded to each other.

Besides, the intermediate layer 7h has a shear strength of 6 MPa or more when it is compressed in a direction parallel to the fiber extending direction of the long fibers 81 of the surface layer 3h, so that when the composite material is subjected to repeated bending fatigue, the core layer or the surface layer is broken, rather than the in terminate layer.

Hence, the spread of braking over the breaking surface to cause a sharp strength reduction which occurs when the intermediate layer is broken is prevented. Accordingly, the composite material of the present invention can preferably be used for the purposes requiring high elasticity, high bending strength and durability against the repeated bending fatigue, including structural materials, such as the shield-use take-off/accession coffering wall for use in the SEW construction method, and cross ties.

The composite material according to the present invention is not limited to the above-illustrated embodiments. For example, while the production unit 4 of the above-illustrated embodiment is so designed that the foam thermosetting resin liquid 59 is sprayed over the group of long fibers 55 and then is impregnated therein with the impregnating device 42, the group of long fibers 55 may alternatively be immersed into the foam thermosetting resin liquid or may be made to pass through between two rolls with banks, to be impregnated with the foam thermosetting resin liquid.

Also, while the vertical production unit is used in the production method of the composite material 1h, a horizontal production unit may alternatively be used.

EXAMPLES

In the following, the examples of the present invention will be described in further detail.

Example 1

After a core layer having a section of a size of 190×100 mm comprising the foam thermosetting urethane resin liquid and the filler shown in the following TABLE 1 was produced, the core layer was cast in the casting mold to produce a composite material having a section of a size of 200×140 mm having a surface layer comprising the long fibers and the foam thermosetting resin liquid shown in TABLE 1 and extending along four lengthwise surfaces.

The composite material produced showed that a ratio of the thickness of the core layer to the sum total of thickness of the surface layer covering the core layer with respect to the thickness direction was 2.5; that the thickness of the surface layer on the side thereof on which a pulling force was exerted when the composite material was bent in the thickness direction represented 14% of the total thickness; and that the thickness of the surface layer on the side thereof on which a compressive force was exerted represented 14% of the total thickness.

In TABLE 1, the polyether polyol represents propylene oxide added polyether polyol (available from Sumitomo Bayer Urethane Ltd., SUMIPHEN 1703, hydroxyl value of 380, polyol equivalent of 147) and the peak particle diameter ratio represents a ratio of most frequent particle diameter values in adjoining peak areas of 8 volume % or more.

The particle diameter of the filler was adjusted with a screen as shown in TABLE 1. The proportion of the filler was obtained by dividing a weight of the filler in the core layer by (a volume of the core layer×a bulk density of the filler). The densities on the following TABLE are expressed in the units of $g/cm^3$.

[Table 1]

Example 2

After a core layer having a section of a size of 190×160 mm comprising the foam thermosetting urethane resin liquid and the filler shown in the following TABLE 2 was produced, the core layer was cast in the casting mold to produce a composite material having a section of a size of 200×200 mm having a surface layer comprising the long fibers and the foam thermosetting resin liquid shown in TABLE 1 and extending along four lengthwise surfaces.

The composite material produced showed that a ratio of the thickness of the core layer to the sum total of thickness of the surface layer covering the core layer with respect to the thickness direction was 4; that the thickness of the surface layer on the side thereof on which a pulling force was exerted when the composite material was bent in the thickness direction represented 10% of the total thickness; and that the thickness of the surface layer on the side thereof on which a compressive force was exerted represented 10% of the total thickness.

In TABLE 2, the polyether polyol represents propylene oxide added polyether polyol (available from Mitsui Chemicals, Inc., MN-3050S, hydroxyl value of 56, polyol equivalent of 1,000) and the peak particle diameter ratio represents a ratio of most frequent particle diameter values in adjoining peak areas of 8 volume % or more.

The particle diameter of the filler was adjusted with the screen as shown in TABLE 2.
[Table 2]

Example 3

After a core layer having a section of a size of 190×80 mm comprising the foam thermosetting urethane resin liquid and the filler shown in the following TABLE 3 was produced, the core layer was cast in the casting mold to produce a composite material having a section of a size of 200×120 mm having a surface layer comprising the long fibers and the foam thermosetting resin liquid shown in TABLE 3 and extending along four lengthwise surfaces.

The composite material produced showed that a ratio of the thickness of the core layer to the sum total of thickness of the surface layer covering the core layer in the thickness direction was 2; that the thickness of the surface layer on the side thereof on which a pulling force was exerted when the composite material was bent in the thickness direction represented 21% of the total thickness; and that the thickness of the surface layer on the side thereof on which a compressive force was exerted represented 13% of the total thickness.

In TABLE 3, the polyether polyol represents a mixture of polyol equivalent of 270 produced by mixing 50 weight % of propylene oxide added polyether polyol (available from Sumitomo Bayer Urethane Ltd., SUMIPHEN 1703, hydroxyl value of 380) and 50 weight % of propylene oxide added polyether polyol (available from Sumitomo Bayer Urethane Ltd., SUMIPHEN 3900, hydroxyl value of 35).

The particle diameter of the filler was adjusted with the screen as shown in TABLE 3.
[Table 3]

Example 4

After a core layer having a section of a size of 190×100 mm comprising the foam thermosetting urethane resin liquid and the filler shown in the following TABLE 4 was produced, the core layer was cast in the casting mold to produce a composite material having a section of a size of 200×140 mm having a surface layer comprising the long fibers and the foam thermosetting resin liquid shown in TABLE 4 and extending along four lengthwise surfaces.

The composite material produced showed that a ratio of the thickness of the core layer to the sum total of thickness of the surface layer covering the core layer in the thickness direction was 2.5; that the thickness of the surface layer on the side thereof on which a pulling force was exerted when the composite material was bent in the thickness direction represented 14% of the total thickness; and that the thickness of the surface layer on the side thereof on which a compressive force was exerted represented 14% of the total thickness.

In TABLE 4, the polyether polyol represents a mixture of polyol equivalent of 270 produced by mixing 50 weight % of propylene oxide added polyether polyol (available from Sumitomo Bayer Urethane Ltd., SUMIPHEN 1703, hydroxyl value of 380) and 50 weight % of propylene oxide added polyether polyol (available from Slumitomo Bayer Urethane Ltd., SUMIPHEN 3900, hydroxyl value of 35).

The particle diameter of the filler was adjusted with the screen as shown in TABLE 4.
[Table 4]

Example 5

After powder of polyethylene terephthalate resin and the filler shown in the following TABLE 5 were mixed and dispersed, the mixture was used to produce a core layer having a section of a size of 200×100 mm by hot-press molding. Thereafter, the core layer was cast in the casting mold to produce a composite material having a section of a size of 200×140 mm having a surface layer comprising the long fibers, unsaturated polyester resin liquid of iso series and fly ash balloon (available from Japan Fillite Ltd.) shown in TABLE 5 and extending along two upper and lower surfaces.

The composite material produced showed that a ratio of the thickness of the core layer to the sum total of thickness of the surface layer covering the core layer in the thickness direction was 2.5; that the thickness of the surface layer on the side thereof on which a pulling force was exerted when the composite material was bent in the thickness direction represented 14% of the total thickness; and that the thickness of the surface layer on the side thereof on which a compressive force was exerted represented 14% of the total thickness.

The particle diameter of the filler was adjusted with the screen as shown in TABLE 5.
[Table 5]

Comparative Example 1

Except that the core layer and the surface layer shown in the following TABLE 6 were formed, the composite material was produced in the same manner as in Example 1.
[Table 6]

Comparative Example 2

Except that the core layer and the surface layer shown in the following TABLE 7 were formed, the composite material was produced in the same manner as in Example 1.
[Table 7]

Comparative Example 3

Except that the core layer and the surface layer shown in the following TABLE 8 were formed, the composite material was produced in the same manner as in Example 1.

However, propylene oxide added polyether polyol (available from Mitsui Chemicals, Inc., MN-300, hydroxyl value of 560, polyol equivalent of 100) was used as the polyether polyol.
[Table 8]

Comparative Example 4

Except that the core layer and the surface layer shown in the following TABLE 9 were formed, the composite material was produced in the same manner as in Example 1.

However, propylene oxide added polyether polyol (available from Sumitomo Bayer Urethane Ltd., SUMIPHEN 3900, hydroxyl value of 35, polyol equivalent of 1,600) was used as the polyether polyol.

[Table 9]

The examinations were made of the bending strength, compression proportional limit, nailing property and innailing property of the composite materials produced in Examples 1–5 and Comparative Examples 1–4. The results are shown in TABLE 10. Also, the examination was made of the flexibility in Examples 1–4 and Comparative Examples 3 and 4, and the examination was also made of the repeated unnailing property in Examples 1–3 and Comparative Example 1. These examination results are also shown in TABLE 10.

The bending strength and the compression proportional limit were measured in accordance with the method prescribed by JIS Z 2101.

As for the nailing property, prepared holes of φ17 mm and depth of 110 mm were bored and then rail screw nails prescribed by JIS E 1109 were screwed into the prepared holes. The composite materials which were not fractured by the boring, were tightened with 80 kN-m or less running torque, and were not cracked in their surfaces by the screw tightening were represented by ○ and all other composite materials than those were represented by x.

As for the unnailing property, the screwed nails screwed in the nailing property tests were pulled out. Not less than 38 kN is represented by ⊚⊚, Not less than 33 kN is represented by ⊚, Not less than 28 kN is represented by ○, Not less than 23 kN is represented by Δ, and Less than 23 kN is represented by x.

The repeated unnailing property was evaluated by the screw nails screwed-in in the unnailing property tests being unnailed repeatedly with a maximum load of 20 kN and a sinusoidal wave of 3 Hz. Those in which no destroy was found at one million repeated unnailings were represented by ⊚, those in which the screw nails were uinnailed at hundred thousand or more to less than one million repeated unnailings were represented by ○, and those in which the screw nails were unnailed at less than hundred thousand repeated unnailings were represented by x.

As for the flexibility:

It was calculated from the following equation, using the deflection at a center of span=Δy, which corresponds to a permissible capacity at rated load center distance in the evaluation of the bending strength.

Deflection (%)=6×(thickness of a test piece)×Δy/(span)$^2$×100

[Table 10]

It is found from TABLE 10 that the composite materials of the present invention were excellent in bending strength, compressive property, nailing property and unnailing property.

Example 6

After the fillers were dispersed in the foam thermosetting resin solution shown in the following TABLE 11, they were cast in the mold to generate a foaming and curing reaction at 100° C. for 30 minutes and thereby a core layer having a rectangular section of a size of 200 mm×100 mm was produced.

Then, 110 parts by weight of thermosetting foam urethane mixed solution shown in TABLE 11 was sprayed over 110 parts by weight of long fibers shown in TABLE 11 so as to be impregnated in the long fibers. Thereafter, in the state of being aligned parallel in the longitudinal direction of the core layer, the long fibers were made to extend with thickness of 20 mm (in the thickness direction) along upper and lower surfaces of the core layer and also extend with thickness of 5 mm (in the widthwise direction) along both lateral side surfaces of the core layer. Thereafter, they were cast in the mold to be foamed and cured at 80° C. for 30 minutes and thereby the composite material having a section of a size of 210 mm×140 mm was produced.

Used as the propylene oxide added polyether polyol in the foam thermosetting resin liquid of the core layer was SUMIPHEN 1703 available from Sumitomo Bayer Urethane Ltd. (hydroxyl value of 380 and polyol equivalent of 147).

[Table 11]

Example 7

Except that the core layer and the surface layer shown in the following TABLE 12 were formed, the composite material was produced in the same manner as in Example 6.

Used as the propylene oxide added polyether polyol in the. foam thermosetting resin liquid of the core layer was a mixture of 50 weight % of SUMIPHEN 1703 available from Sumitomo Bayer Urethane Ltd. (hydroxyl value of 380 and polyol equivalent of 147) and 50 weight % of SUMIPHEN 3900 available from Sumitomo Bayer Urethane Ltd. (hydroxyl value of 35 and polyol equivalent of 1,600).

[Table 12]

Comparative Example 5

Except that the core layer and the surface layer shown in the following TABLE 13 were formed, the composite material was produced in the same manner as in Example 6.

Used as the propylene oxide added polyether polyol in the foam thermosetting resin liquid of the core layer was SUMIPHEN 1703 available from Sumitomo Bayer Urethane Ltd. (hydroxyl value of 380 and polyol equivalent of 147).

[Table 13]

Comparative Example 6

The molded material comprising only the longitudinally fiber reinforced foam resin with the same compounding as that of the surface layer of Example 6 was produced.

The measurements were made of the compression proportional limit and nailing property of the composite materials or molded materials produced in Examples 6, 7 and Comparative Examples 5, 6. Also, the measurements were made of the bending strength, bending modulus and deflection (%) at the singular point of the composite materials produced in Examples 6, 7 and Comparative Example 5 and the bending modulus of the same when the deflection is increased from the singular point. The results are shown in TABLE 14.

It is to be noted that the bending modulus when the deflection is increased was calculated from the slope of the tangent line at the singular point found from the large deflection direction.

The bending strength, the bending modulus and the compression proportional limit were measured in accordance with the method prescribed by JIS Z 2101.

The deflection was calculated from the equation of Deflection (%)=6×(thickness of a test piece)×Δy/(span)$^2$×

100, using the deflection at a center of span=Δy, which corresponds to a permissible capacity at rated load center distance in the evaluation of the bending strength.

The core layer and the composite material were bent in the direction orthogonal to the longitudinal direction of the test piece. As to the composite material, the alignment direction of the long fibers contained in the surface layer was taken as the longitudinal direction of the test piece.

As for the unnailing property, after the prepared holes having a diameter of 17 mm and a depth of 110 mm were bored in the surface of the test piece covered with the surface layer, the rail screw nails prescribed by JIS E 1109 were driven 20 mm to their underhead fillets. Then, the unnailing resistance values were measured at a velocity of 10 mm per minute. Not less than 23 kN is represented by Δ, Not less than 28 kN is represented by ○, Not less than 33 kN is represented by ⊚, and Less than 23 kN is represented by x.
[Table 14]

It will be understood from TABLE 14 that the composite material of the present invention thus constructed can produce excellent bending and compression strength, improved compression properties, in particular, as compared with the material comprising only the surface layer and no core layer, and excellent unnailing properties and, hence, can be effectively used for synthetic woods, particularly for cross ties.

Example 8

The filler containing foam thermosetting resin liquid of the same kind as the one used for forming the core layer of Example 6 was cast in the mold as a first filler-containing layer material, first, and then was evened out. Thereafter, the filler containing foam thermosetting resin liquid of the same kind was cast in the mold as a second filler-containing layer material. Then, they were subjected to the foaming and curing reaction at 100° C. for 30 minutes and thereby the core layer was produced which comprises the first filler-containing layer having a rectangular section of a size of 200 mm×100 mm and a thickness of 50 mm and the second filler-containing layer having a thickness of 50 mm which layers are laminated.

Then, the composite material, having the surface layer which extends with thickness of 20 mm along upper and lower surfaces of the core layer and with thickness of 5 mm along both lateral side surfaces of the core layer and is identical in constitution to that of Example 6 and having a section of a size of 210×140 mm, was cast-molded in the same manner as in Example 6.

Example 9

The filler-containing foam thermosetting resin liquid of the same kind as the one used for forming the core layer of Example 6 was cast in the mold as a first filler-containing layer material, first, and then was subjected to the foaming and curing reaction at 100° C. for 30 minutes to thereby produce a sheet material that is a first filler-containing layer having a rectangular section of a size of 200 mm×50 mm.

Subsequently, a first intermediate material of a size of 210×75 mm having a long fiber reinforced layer extending with a thickness of 20 mm along an upper surface of the sheet material, with a thickness of 5 mm along a lower surface thereof, and with a thickness of 5 mm along both lateral sides thereof was produced in the same conditions as those for the surface layer of Example 6.

Then, the filler-containing foam thermosetting resin liquid of the same kind as the one used for forming the core layer of Example 2 was cast in the mold as a second filler-containing layer material, first, and then was subjected to the foaming and curing reaction at 100° C. for 30 minutes to thereby produce a sheet material that is a second filler-containing layer having a rectangular section of a size of 200 mm×50 mm.

Subsequently, a second intermediate material of a size of 210×65 mm having a long fiber reinforced layer extending with a thickness of 5 mm along an upper surface of the sheet material, with a thickness of 5 mm along a lower surface thereof, and with a thickness of 5 mm along both lateral sides thereof was produced in the same conditions as those for the surface layer of Example 6.

Then, epoxy adhesive (ESURON 410 available from Sekisui Chemical Co., Ltd.) was applied to a lower surface of the first intermediate material thus produced and an upper surface of the second intermediate material thus produced. Those surfaces were put in press-contact with each other at room temperature for 24 hours to thereby produce a composite material having an intermediate fiber-reinforced layer having a thickness of 10 mm between the first filler-containing layer and the second filler-containing layer.

The examinations were made of the bending strength, bending modulus, unnailing property and deflection of the composite materials produced in Examples 8 and 9. The results are shown in TABLE 15, together with those of the composite material of Example 6.

As for the unnailing property, after the prepared holes having a diameter of 17 mm and a depth of 120 mm were bored in the surface of the test piece covered with the surface layer, the rail screw nails prescribed by JIS E 1109 were driven 20 mm to their underhead fillets. Then, the unnailing resistance values were measured at a velocity of 10 mm per minute. Not less than 23 kN is represented by Δ, Not less than 28 kN is represented by ○, Not less than 33 kN is represented by ⊚, Not less than 38 kN is represented by ⊚⊚, Not less than 43 kN is represented by ⊚⊚⊚, and Less than 23 kN is represented by x.
[Table 15]

It will be understood from TABLE 15 that the composite material having the core layer formed by the lamination of a plurality of core layer forming composition layers provides an improved bending strength, as compared with the composite material having the core layer of a single layer structure. Further, the core layer formed to have the intermediate fiber-reinforced layer between the filler-containing layer and the filler-containing layer provides an improved unnailing property as well.

Example 10

As shown in TABLE 16, raw material of foam vinyl chloride resin in which 0.05 parts by weight of ADCA (azodicarbonamide) as a foaming agent was compounded in 100 parts by weight of vinyl chloride resin (PVC compound available from Tokuyama Sekisui Co., Ltd.) was extruded to form a sheet-like molded product having a section of a size of 160×100 mm that forms the core layer.

The sheet-like molded product was surrounded by use of the long fibers and the foam thermosetting resin liquid shown in TABLE 16 and the production unit 4 shown in FIG. 3, to produce a composite material of a size of 200×140 mm in section having a surface layer around the core layer having the section of the size of 160×100 mm.
[Table 16]

Example 11

A composite material having a section of a size of 200×140 mm, which includes the surface layer comprising the long fibers and the foam thermosetting resin liquid shown in TABLE 17 to surround the core layer having a section of a size of 160×100 mm comprising the foam thermosetting resin liquid and the filler shown in the following TABLE 17, was produced with the production unit 4 shown in FIG. 3. The shaped material extruded from the shaping die had a section of 160×100 mm.
[Table 17]

Example 12

A composite material having a section of a size of 200×140 mm, which includes the surface layer comprising the long fibers and the foam thermosetting resin liquid shown in TABLE 18 to surround the core layer having a section of a size of 160×100 mm comprising the foam thermosetting resin liquid and the filler shown in the following TABLE 18, was produced with the production unit 4 shown in FIG. 3. The shaped material extruded from the shaping die had a section of 160×100 mm.
[Table 18]

Comparative Example 7

A composite material having a section of a size of 200×140 mm and comprising only the long fibers and foam thermosetting resin liquid used for the surface layer of Example 10 was produced.

Comparative Example 8

As shown in TABLE 19, after a mixture of 20 parts by weight of resol-base phenol particles (BERU PAARU (Name of article) available from KANEBO, LTD.) and 80 parts by weight of No. 5 silica sand was preheated, the mixture was hot-pressed at 200° C. with 20kg/cm$^2$ to thereby produce a porous material that is the core layer having a section of a size of 160×100 mm.

This porous material was surrounded by use of the long fibers and the foam thermosetting resin liquid shown in TABLE 19 and the production unit 4 shown in FIG. 3, to produce a composite material having a section of a size of 200×140 mm having a surface layer around the core layer having the section of the size of 160×100 mm.
[Table 19]

Comparative Example 9

As shown in TABLE 20, polystyrene resin (available from SUMITOMO CHEMICAL CO., LTD.) was extruded and foamed to produce a polystyrene low power foam that is the core layer having a section of a size of 160×100 mm.

This foam was surrounded by use of the long fibers and the foam thermosetting resin liquid shown in TABLE 20 and the production unit 4 shown in FIG. 3, to produce a composite material having a section of a size of 200×140 mm having a surface layer around the core layer having the section of the size of 160×100 mm.
[Table 20]

Comparative Example 10

Elastic urethane foam that is the core layer of 160×100 mm was produced by using urethane resin having the composition shown in TABLE 21.

This elastic urethane foam was surrounded by use of the long fibers and the foam thermosetting resin liquid shown in TABLE 21 and the production unit 4 shown in FIG. 3, to produce a composite material having a section of a size of 200×140 mm having a surface layer around the core layer having the section of the size of 160×100 mm.
[Table 21]

The examinations were made of Ca, Cb, CSa, CSb, Ea, Eb, ESa, ESb, DBa, bending strength, nailing property and unnailing property of the composite materials produced in Examples 10–12 and Comparative Examples 7–10. The results are shown in TABLE 22.
[Table 22]

It will be clearly understood from TABLE 22 that the setting of CSa, CSb, Ea, Eb, ESa, ESb, and DBa to the constitution of the composite material of claims 10 and 11 enables the volume of the surface layer to reduce and achieves improvement in bending strength and improvement in flexibility as well as in compression proportional limit, nailing property and unnailing property.

Example 13

A composite material having a section of a size of 200×140 mm and a length of 2,020 mm and comprising a core layer having a section of a size of 180×100 mm shown in the following TABLE 23, an intermediate layer comprising a non-foam urethane resin of a thickness of about 2 mm and polyester non-woven fabric (SUPAN BONDO E 1050 available from ASAHI CHEMICAL INDUSTRIAL CO., LTD.) as a resin impregnated sheet-like material, and a surface layer shown in TABLE 23 was produced with the vertical production line shown in FIG. 13.
[Table 23]

Microscopic examination of the obtained composite material at or around the interface between the core layer and the surface layer found the presence of the intermediate layer in which the resin impregnated sheet-like material was arranged.

Example 14

Except that the surface layer, the intermediate layer and the core layer shown in the following TABLE 24 were formed, a composite material was produced in the same manner as in Example 13.

It was found that the intermediate layer of a thickness of about 3 mm made of epoxy resin was formed between the core layer and the surface layer.
[Table 24]

Reference Example 1

Figure 14:
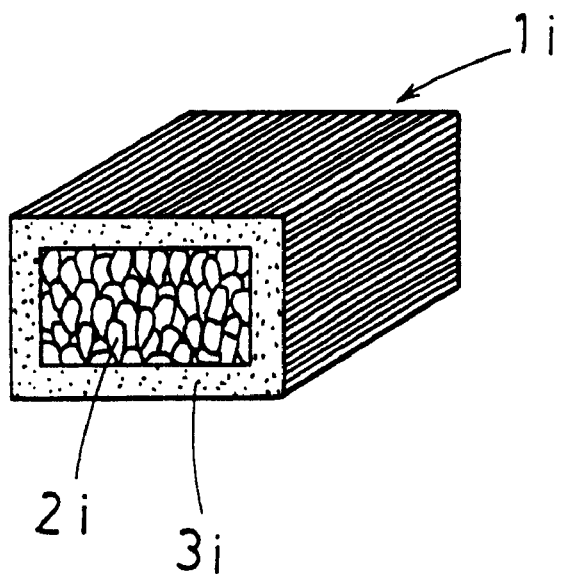
FIG. 14 is a sectional view of the composite material produced in Reference Example 1.

Except that no intermediate layer was provided, a composite material 1i having a core layer 2i and a surface layer 3i as shown in FIG. 14 was produced in the same manner as in Example 13.

Reference Example 2

Figure 15:
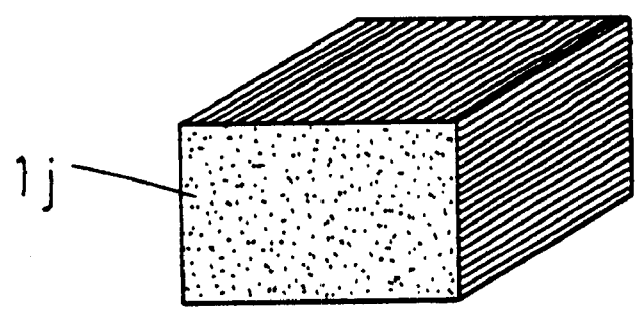
FIG. 15 is a sectional view of the composite material produced in Reference Example 2.

As shown in FIG. 15, a composite material 1j consisting of only the surface layer of Example 13 was produced.

The measurements were made of the shear strength of the interface between the core layer and the surface layer of each of the composite materials obtained from Examples 13, 14 and Reference Examples 1, 2. The results are shown in TABLE 25, together with the results of the bending strength, bending modulus, compression strength (JIS K 2101) and wood workability such as cutting.

The shear strength was measured in accordance with the method prescribed by JIS Z 2101 with TENSIRON UCT-5T made of ORIENTEC CO., LTD. at a cross head velocity of 1 mm/min.

[Table 25]

It will be clearly understood from TABLE 25 that the composite material having the intermediate layer which is provided between the surface layer and the core layer and the surface. layer and through which the core layer are integrally bonded to each other, as the composite material of claim 13, can provide a far stronger interfacial strength than the composite material having no intermediate layer and, further, can fully be applicable to the SEW process as one of a variety of uses.

Example 15

Except that the surface layer, the intermediate layer and the core layer shown in the following TABLE 26 were formed, a composite material was produced in the same manner as in Example 13.

Used as propylene oxide added polyether polyol was SUMIPHEN 1703 (hydroxyl value of 380, polyol equivalent of 147) available from Sumitomo Bayer Urethane Ltd.

The composite material produced was found to have the core layer having the shear strength of 6 MPa, the surface layer having the shear strength of 8 MPa, and the intermediate layer of a thickness of 1 mm formed therebetween and formed of low-power foam resin having a density of 0.50 that is 1.1 times as dense as in the core layer.

[Table 26]

Example 16

Except that the surface layer, the intermediate layer and the core layer shown in the following TABLE 27 were formed, a composite material was produced in the same manner as in Example 13.

The composite material produced was found to have the core layer having the shear strength of 6 MPa, the surface layer having the shear strength of 8 MPa, and intermediate layer portions of a thickness of 1 mm formed between the core layer and the non-woven fabric and between the non-woven fabric and the surface layer, respectively, and having a density of 0.50 that is 1.1 times as dense as in the core layer.

[Table 27]

Example 17

Except that the surface layer, the intermediate layer and the core layer shown in the following TABLE 28 were formed, a composite material was produced in the same manner as in Example 13.

The composite material produced was found to have the core layer having the shear strength of 6 MPa, the surface layer having the shear strength of 8 MPa, and intermediate layer portions of a thickness of 1 mm formed between the core layer and the non-woven fabric and between the non-woven fabric and the surface layer, respectively, and having a density of 0.48 that is 1.1 times as dense as in the core layer.

[Table 28]

Figure 16:
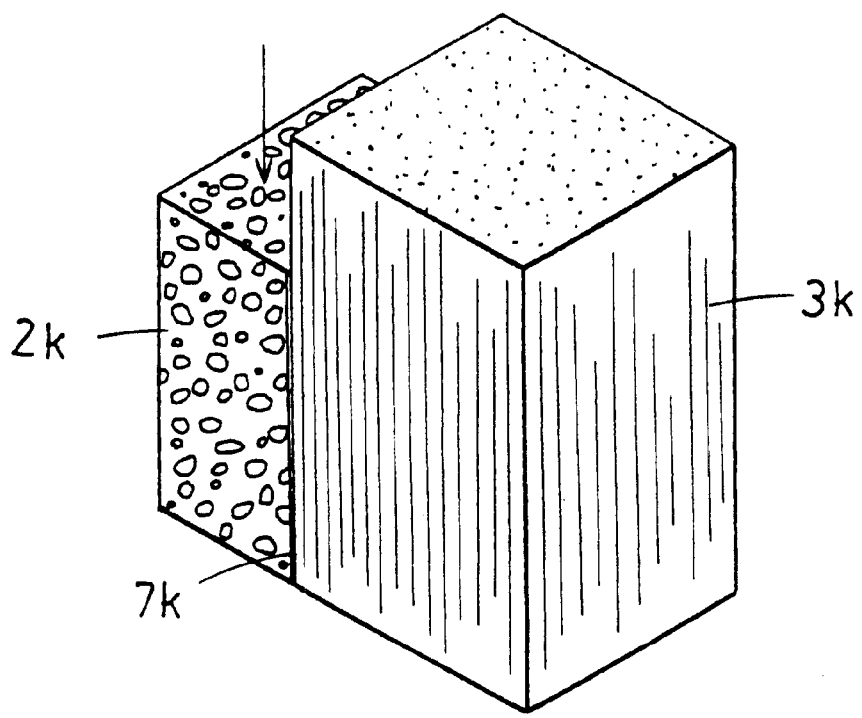
FIG. 16 is an illustration for explaining the way of a shearing test.
Figure 17:
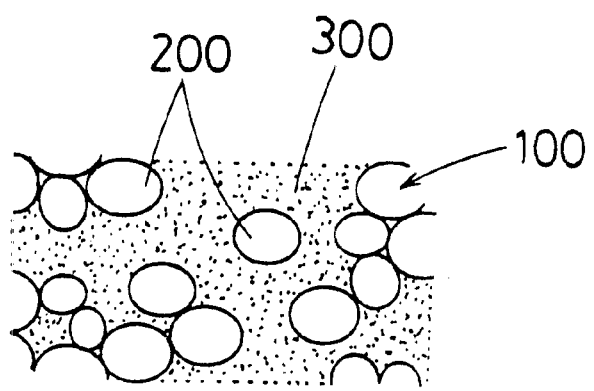
FIG. 17 is a schematic diagram of an enlarged sectional view of a core layer of a conventional composite material.
Figure 18:
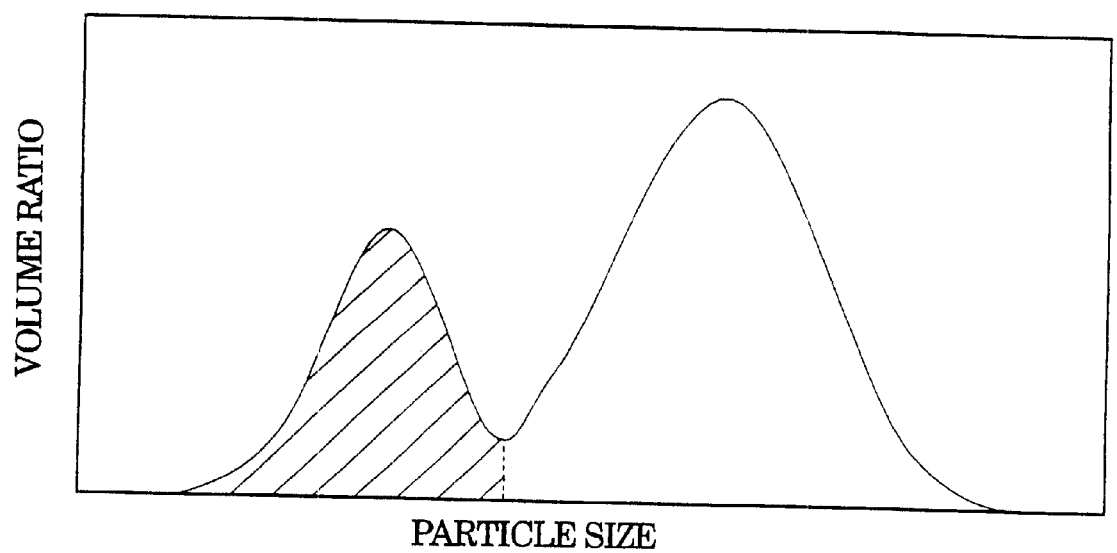
FIG. 18 is an illustration for explaining the way of finding a volume percent of a peak area from a particle size distribution curve of filler.

The composite materials obtained in Examples 15–17 and Comparative Example 5 were subjected to the shearing tests in accordance with the method prescribed by JIS Z 2101, in accordance with which compressive force was applied to the composite material in the direction parallel to the fiber extending direction in such a manner that a breaking surface can be formed in an intermediate layer portion 7k between a core layer 2k and a surface layer 3k, as shown in FIG. 16. The measurement results are shown in TABLE 29. In addition, the measurements were made of the bending strength and bending modulus in accordance with the method prescribed by JIS Z 2101, the results being shown in TABLE 29, together with the results of the repeated bending fatigue tests.

It is to be noted that the repeated bending fatigues tests were performed in accordance with the fixed stress repeated bending tests with a span distance of 1,960 mm, a bending stress of 60 MPa and a frequency of 6 Hz. Not less than $1 \times 10^7$ in the number of bending repeated until breakage is represented by ⊙, Less than $1 \times 10^7$ to not less than $1 \times 10^6$ is represented by ○, and Less than $1 \times 10^6$ is represented by x. Also, as to the destruction, the case of destruction being caused between the surface layer and the core layer is represented by x, and the case of no destruction being found between the surface layer and the core layer or the case of destruction being not caused by repeated bending of not less than $1 \times 10^7$ is represented by ○.

[Table 29]

It will be clearly understood from TABLE 29 that the composite material of claim 20 provides excellent properties of not only the bending strength and the bending modulus but also the durability against the repeated bending.

Capabilities of Exploitation in Industry

The composite material according to the present invention thus constructed can achieve further improvement of compression strength and nailing property.

When the composite material is used as cross ties and the like, that will be able to absorb vibrations easily to reduce noise. In addition, since the core layer is resistant to destroying, if damage originates from deterioration, the damage will then be caused to the surface layer and thus will be easily detectable.

Further, specific gravity of the composite material produced can be easily adjusted by adjusting the specific gravity of fillers of the core layer, such that the composite material can be used for various uses ranging from weight saving use to weighted use.

With the constitution of claim 5, in particular, the coefficient of thermal expansion of the core layer comes near that of the surface layer. Consequently, even when environmental temperature varies largely, little deformation is produced in an interface between the surface layer and the core layer, thus providing a high reliability of long-term layer-to-layer adhesion properties.

With the constitution of claim 6, the resistance to the repeated unnailing is improved, thus producing the result that when the composite material is used as cross ties, the time-interval for maintenance of the cross ties can be elongated.

With the constitution of claim 9, destroy of the core layer is suppressed, thus producing improvement in flexibility, as well as in bending strength, compression proportional limit, nailing property and unnailing property. Hence, when the composite material is used as cross ties and the like, that will be able to easily absorb vibrations to reduce noise. In addition, since the core layer is resistant to destroying, if damage originates from deterioration, the damage will then be caused to the surface layer and thus will be easily detectable.

With the constitution of claims 14 and 15, the composite material can suitably be used for a cross tie (a railway sleeper, in particular), a pressure bearing board and a shield-use take-off/accession coffering wall (SEW) which require high bending strength and bending modulus. Also, since the product size can be reduced for purposes not requiring high bending strength and bending modulus, cost reduction of material can be achieved. Also, since the intermediate fiber-reinforced layer is provided between the filler-containing layer and the filler-containing layer, the nail struck can be bound by the long fibers of the intermediate fiber-reinforced layer to provide an improved nail holding performance.

With the constitution of claim 18, destroy of the core layer is suppressed, thus producing improvement in flexibility, as well as in bending strength, compression proportional limit, nailing property and unnailing property. Hence, when the composite material is used as cross ties and the like, that will be able to absorb vibrations further easily to reduce noise.

With the constitution of claim 19, the core layer and the surface layer are integrated through the non-foam thermosetting resin layer, thus providing a very excellent interfacial strength.

When used as a material used for the SEW construction method which is one of a variety of uses of the same, the composite material can be used as a unit by itself, without any need for a plurality of flat plates to be laminated and adhesive bonded together under pressure, differently from the conventional synthetic wood. Thus, the adhering process can be omitted and the strength can be made equal to or more than that of the conventional synthetic wood.

With the constitution of claim 20, the durability against the repeated bending fatigue, in particular, can be improved so that the composite material can be used further suitably for structural material, such as a wall material for the SEW construction method, and a railway sleeper which require high durability against the bending fatigue.

With the constitution of claim 21, the intermediate layer can be allowed to have further strength by a high strength sheet and the like being used as a resin impregnated sheet.

When the intermediate layer is formed, the non-foam thermosetting resin may be impregnated in the resin-containing sheet-like material, for facilitation of the forming of the intermediate layer.

With the constitution of claim 22, the composite material of higher mechanical strength, capable to form closed cells easily when foamed, and excellent unabsorbent can be produced.

With the constitution of claim 26, a further stable bending strength can be yielded.

The synthetic cross tie according to claim 27, which uses the composite material of the present invention mentioned above for it, have the same excellent capabilities as the native wood. It is of excellent in adhesion strength in the interface, in other words, in interfacial strength.

TABLE 1

| | | | | Volume % | Density | Filling Rate |
|---|---|---|---|---|---|---|
| Core layer | Filler | Silica sand: | | 65 | 1.83 | 0.93 |
| | | Average particle size: 1.14 mm, | | | (Resin 0.4) | |
| | | Peak particle size ratio: 0.07 | | | | |
| | | Bulk density: 1.82 g/cm$^3$ | | | | |
| | | Standard size: 2 mm Passing, | 80 Volume % | | | |
| | | 1.4 mm Remaining | | | | |
| | | Standard size: 212 μm Passing. | 20 Volume % | | | |
| | | 106 μm Remaining | | | | |
| | Resin | Polyether polyol | (100 parts by weight) | | | |
| | | Polymeric MDI (NCO % = 31%) | (130 parts by weight) | | | |
| | | Silicone oil foam stabilizer | (0.15 parts by weight) | | | |
| | | Water | (0.5 parts by weight) | | | |
| | | Dibutyltin laurate catalyst | (0.5 parts by weight) | | | |
| Surface layer | Long fiber | E glass fiber roving | | 20 | 0.97 | — |
| | | 13 μm mono-filament bundling | | | (Resin 0.58) | |
| | Resin | Polyether polyol | (100 parts by weight) | 80 | | |
| | | Polymeric MDI (NCO % = 31%) | (160 parts by weight) | | | |
| | | Silicone oil foam stabilizer | (0.15 parts by weight) | | | |
| | | Water | (0.7 parts by weight) | | | |
| | | Dibutyltin laurate catalyst | (1.8 parts by weight) | | | |

TABLE 2

| | | | | Volume % | Density | Filling Rate |
|---|---|---|---|---|---|---|
| Core layer | Filler | Silica sand: | | 55 | 1.59 | 0.98 |
| | | Average particle size: 1.14 mm, | | | (Resin 0.35) | |
| | | Peak particle size ratio: 0.59 | | | | |
| | | Bulk density: 1.46 g/cm$^3$ | | | | |
| | | Standard size: 1 mm Passing, | 30 Volume % | | | |
| | | 850 μm Remaining | | | | |
| | | Standard size: 600 μm Passing. | 70 Volume % | | | |
| | | 500 μm Remaining | | | | |
| | Resin | Polyether polyol | (100 parts by weight) | 45 | | |
| | | Polymeric MDI (NCO % = 31%) | (130 parts by weight) | | | |
| | | Silicone oil foam stabilizer | (0.15 parts by weight) | | | |
| | | Water | (0.5 parts by weight) | | | |
| | | Dibutyltin laurate catalyst | (0.5 parts by weight) | | | |

TABLE 2-continued

| | | | | Volume % | Density | Filling Rate |
|---|---|---|---|---|---|---|
| Surface layer | Long fiber | E glass fiber roving 13 μm mono-filament bundling | | 14 | 0.74 (Resin 0.45) | — |
| | Resin | Polyether polyol | (100 parts by weight) | | | |
| | | Polymeric MDI (NCO % = 31%) | (160 parts by weight) | | | |
| | | Silicone oil foam stabilizer | (0.15 parts by weight) | | | |
| | | Water | (0.7 parts by weight) | | | |
| | | Dibutyltin laurate catalyst | (1.8 parts by weight) | | | |

TABLE 3

| | | | | Volume % | Density | Filling Rate |
|---|---|---|---|---|---|---|
| Core layer | Filler | Silica sand: Average particle size: 0.6 mm, Standard size: 710 μm Passing, 600 μm Remaining | 100 Volume % | 56 | 1.72 (Resin 0.55) | 1.0 |
| | | Glass short fiber | | 1 | | |
| | | 6 mm in length Bulk density after mixture: 1.48 g/cm³ | | | | |
| | Resin | Polyether polyol | (100 parts by weight) | 43 | | |
| | | Polymeric MDI (NCO % = 31%) | (60 parts by weight) | | | |
| | | Silicone oil foam stabilizer | (1 parts by weight) | | | |
| | | Water | (1 parts by weight) | | | |
| | | Dibutyltin laurate catalyst | (0.3 parts by weight) | | | |
| Surface layer | Long fiber | E glass fiber roving 13 μm mono-filament bundling | | 12 | 0.63 (Resin 0.37) | — |
| | Resin | Polyether polyol | (100 parts by weight) | 88 | | |
| | | Polymeric MDI (NCO % = 31%) | (160 parts by weight) | | | |
| | | Silicone oil foam stabilizer | (1 parts by weight) | | | |
| | | Water | (1 parts by weight) | | | |
| | | Dibutyltin laurate catalyst | (1.8 parts by weight) | | | |

TABLE 4

| | | | | Volume % | Density | Filling Rate |
|---|---|---|---|---|---|---|
| Core layer | Filler | N Light available from NAIGAI CERAMIC CO., LTD. Average particle size: 1.00 mm, Standard size: 1.4 mm Passing, 1 mm Remaining Bulk density: 0.58 g/cm³ | 100 Volume % | 55 | 0.70 (Resin 0.30) | 0.95 |
| | Resin | Polyether polyol | (100 parts by weight) | 45 | | |
| | | Polymeric MDI (NCO % = 31%) | (60 parts by weight) | | | |
| | | Silicone oil foam stabilizer | (0.15 parts by weight) | | | |
| | | Water | (0.5 parts by weight) | | | |
| | | Dibutyltin laurate catalyst | (0.5 parts by weight) | | | |
| Surface layer | Long fiber | E glass fiber roving 13 μm mono-filament bundling | | 14 | 0.74 (Resin 0.45) | — |
| | Resin | Polyether polyol | (100 parts by weight) | 86 | | |
| | | Polymeric MDI (NCO % = 31%) | (160 parts by weight) | | | |
| | | Silicone oil foam stabilizer | (0.15 parts by weight) | | | |
| | | Water | (0.7 parts by weight) | | | |
| | | Dibutyltin laurate catalyst | (1.8 parts by weight) | | | |

TABLE 5

| | | | | Volume % | Density | Filling Rate |
|---|---|---|---|---|---|---|
| Core layer | Filler | Silica sand: Average particle size: 0.6 mm, Standard size: 710 μm Passing, 600 μm Remaining | 100 Volume % | 41 | 1.77 | 0.71 |

TABLE 5-continued

|  |  |  |  | Volume % | Density | Filling Rate |
|---|---|---|---|---|---|---|
| Surface layer | Resin | Bulk density: 1.50 g/cm³ Polyether terephtarate |  | 59 |  |  |
|  | Long fiber | E glass fiber roving 13 μm mono-filament bundling |  | 24 |  |  |
|  | Resin | Unsaturated polyester of iso series | (100 parts by weight) | 57 | 1.5 | — |
|  |  | tert-butyl peroxide | (1 parts by weight) |  | (Resin 0.37) |  |
|  |  | Glass Balloon (Specific gravity 0.3) | (6.7 parts by weight) | 19 |  |  |

TABLE 6

|  |  |  |  | Volume % | Density | Filling Rate |
|---|---|---|---|---|---|---|
| Core layer | Filler | Silica sand: Average particle size: 0.09 mm, Standard size: 100 μm Passing, 90 μm Remaining Bulk density: 1.41 g/cm³ | 100 Volume % | 27 | 0.96 (Resin 0.35) | 0.5 |
|  | Resin | Polyether polyol | (100 parts by weight) | 73 |  |  |
|  |  | Polymeric MDI (NCO % = 31%) | (130 parts by weight) |  |  |  |
|  |  | Silicone oil foam stabilizer | (0.15 parts by weight) |  |  |  |
|  |  | Water | (0.5 parts by weight) |  |  |  |
|  |  | Dibutyltin laurate catalyst | (0.3 parts by weight) |  |  |  |
| Surface layer | Long fiber | E glass fiber roving 13 μm mono-filament bundling |  | 3 | 0.4 (Resin 0.33) | — |
|  | Resin | Polyether polyol | (100 parts by weight) | 97 |  |  |
|  |  | Polymeric MDI (NCO % = 31%) | (160 parts by weight) |  |  |  |
|  |  | Silicone oil foam stabilizer | (0.15 parts by weight) |  |  |  |
|  |  | Water | (0.7 parts by weight) |  |  |  |
|  |  | Dibutyltin laurate catalyst | (1.8 parts by weight) |  |  |  |

TABLE 7

|  |  |  |  | Volume % | Density | Filling Rate |
|---|---|---|---|---|---|---|
| Core layer | Filler | Silica sand: Average particle size: 1.14 mm, Peak particle size ratio: 0.59 Bulk density: 1.46 g/cm³ |  | 34 | 1.12 (Resin 0.35) | 0.6 |
|  |  | Standard size: 1 mm Passing, 850 μm Remaining | 30 Volume % |  |  |  |
|  |  | Standard size: 600 μm Passing. 500 μm Remaining | 70 Volume % |  |  |  |
|  | Resin | Polyether polyol | (100 parts by weight) | 66 |  |  |
|  |  | Polymeric MDI (NCO % = 31%) | (130 parts by weight) |  |  |  |
|  |  | Silicone oil foam stabilizer | (0.15 parts by weight) |  |  |  |
|  |  | Water | (0.5 parts by weight) |  |  |  |
|  |  | Dibutyltin laurate catalyst | (0.5 parts by weight) |  |  |  |
| Surface layer | Long fiber | E glass fiber roving 13 μm mono-filament bundling |  | 14 | 0.74 (Resin 0.45) | — |
|  | Resin | Polyether polyol | (100 parts by weight) | 86 |  |  |
|  |  | Polymeric MDI (NCO % = 31%) | (160 parts by weight) |  |  |  |
|  |  | Silicone oil foam stabilizer | (0.15 parts by weight) |  |  |  |
|  |  | Water | (0.7 parts by weight) |  |  |  |
|  |  | Dibutyltin laurate catalyst | (1.8 parts by weight) |  |  |  |

TABLE 8

|  |  |  |  | Volume % | Density | Filling Rate |
|---|---|---|---|---|---|---|
| Core layer | Filler | Silica sand: Average particle size: 0.15 mm | (100 parts by weight) | 45 | 1.04 (Resin 0.24) | 0.62 |
|  |  | Glass foam | (225 parts by weight) |  |  |  |
|  |  | Average particle size: 6 mm Bulk density in the mixed state: 1.48 g/cm³ |  |  |  |  |

TABLE 8-continued

|  |  |  |  | Volume % | Density | Filling Rate |
|---|---|---|---|---|---|---|
|  | Resin | Polyether polyol | (100 parts by weight) | 55 |  |  |
|  |  | Polymeric MDI (NCO % = 31%) | (170 parts by weight) |  |  |  |
|  |  | Silicone oil foam stabilizer | (1 parts by weight) |  |  |  |
|  |  | Water | (1 parts by weight) |  |  |  |
|  |  | Dibutyltin laurate catalyst | (0.3 parts by weight) |  |  |  |
| Surface layer | Long fiber | E glass fiber roving 13 μm mono-filament bundling |  | 18 |  |  |
|  | Resin | Polyether polyol | (100 parts by weight) | 82 | 0.74 | — |
|  |  | Polymeric MDI (NCO % = 31%) | (160 parts by weight) |  | (Resin 0.45) |  |
|  |  | Silicone oil foam stabilizer | (1 parts by weight) |  |  |  |
|  |  | Water | (1 parts by weight) |  |  |  |
|  |  | Dibutyltin laurate catalyst | (0.5 parts by weight) |  |  |  |

TABLE 9

|  |  |  |  | Volume % | Density | Filling Rate |
|---|---|---|---|---|---|---|
| Core layer | Filler | Silica sand: Average particle size: 0.15 mm | (100 parts by weight) | 45 | 1.04 (Resin 0.24) | 0.62 |
|  |  | Glass foam | (225 parts by weight) |  |  |  |
|  |  | Average particle size: 6 mm Bulk density in the mixed state: 1.48 g/cm³ |  |  |  |  |
|  | Resin | Polyether polyol | (100 parts by weight) | 55 |  |  |
|  |  | Polymeric MDI (NCO % = 31%) | (30 parts by weight) |  |  |  |
|  |  | Silicone oil foam stabilizer | (1 parts by weight) |  |  |  |
|  |  | Water | (1 parts by weight) |  |  |  |
|  |  | Dibutyltin laurate catalyst | (0.3 parts by weight) |  |  |  |
| Surface layer | Long fiber | E glass fiber roving 13 μm mono-filament bundling |  | 18 |  |  |
|  | Resin | Polyether polyol | (100 parts by weight) | 82 | 0.74 | — |
|  |  | Polymeric MDI (NCO % = 31%) | (120 parts by weight) |  | (Resin 0.45) |  |
|  |  | Silicone oil foam stabilizer | (1 parts by weight) |  |  |  |
|  |  | Water | (1 parts by weight) |  |  |  |
|  |  | Dibutyltin laurate catalyst | (0.5 parts by weight) |  |  |  |

TABLE 10

|  | Bending modulus of surface layer | Bending strength | Bending modulus | Compression proportional limit | Nailing | Unnailing performance | Repeated unnailing | Deflection |
|---|---|---|---|---|---|---|---|---|
| Ex. |  |  |  |  |  |  |  |  |
| 1 | 12,000 MPa | 150 MPa | 13,000 MPa | 15 MPa | ○ | ⊚⊚ | ⊚ | 1.3% |
| 2 | 8,800 MPa | 130 MPa | 8,600 MPa | 12 MPa | ○ | ⊚⊚ | ⊚ | 1.7% |
| 3 | 7,100 MPa | 120 MPa | 7,100 MPa | 13 MPa | ○ | ⊚ | ○ | 2.2% |
| 4 | 8,800 MPa | 110 MPa | 8,400 MPa | 12 MPa | ○ | ○ | — | 1.1% |
| 5 | 9,000 MPa | 100 MPa | 8,500 MPa | 14 MPa | ○ | ○ | — | — |
| Compa. Ex. |  |  |  |  |  |  |  |  |
| 1 | 3,000 MPa | 20 MPa | — | 2 MPa | ○ | x | x | — |
| 2 | — | 90 MPa | — | 13 MPa | x | x | x | — |
| 3 | — | 40 MPa | 6,800 MPa | 3 MPa | x | x | — | 0.6% |
| 4 | — | 30 MPa | 6,300 MPa | 2 MPa | ○ | x | — | 0.5% |

TABLE 11

|  |  |  |  | Vol. % | Wt. % | Density | Filling Rate |
|---|---|---|---|---|---|---|---|
| Core layer | Filler | No. 1 Silica sand Particle size: 1.5 mm, Bulk density: 1.42 g/cm³ Available from Rokuroya Kogyo Co., Ltd. | (43 parts by weight) | 50 | 85 | 1.53 (Resin 0.45) | 0.92 |

TABLE 11-continued

|  |  |  |  | Vol. % | Wt. % | Density | Filling Rate |
|---|---|---|---|---|---|---|---|
|  | Resin | Polydiphenylmethane diisocyanate | (140 parts by weight) | 50 | 15 |  |  |
|  |  | Propylene oxide added polyether polyol | (100 parts by weight) |  |  |  |  |
|  |  | Silicone oil foam stabilizer | (1 parts by weight) |  |  |  |  |
|  |  | Water | (0.5 parts by weight) |  |  |  |  |
|  |  | Dibutyltin laurate catalyst | (0.5 parts by weight) |  |  |  |  |
| Surface layer | Long fiber | E glass fiber roving |  | 15 | — | 0.73 | — |
|  |  | 12 μm mono-filament bundling |  |  |  |  |  |
|  |  | (200 × 60) |  |  |  |  |  |
|  | Resin | Polyether polyol (OH value = 480) | (100 parts by weight) | 85 | — |  |  |
|  |  | Polymethylene polyphenyl polyisocyanate (NCO % = 31%) | (160 parts by weight) |  |  |  |  |
|  |  | Silicone oil foam stabilizer | (0.15 parts by weight) |  |  |  |  |
|  |  | Water | (0.7 parts by weight) |  |  |  |  |
|  |  | Dibutyltin laurate catalyst | (1.8 parts by weight) |  |  |  |  |

TABLE 12

|  |  |  |  | Vol. % | Wt. % | Density | Filling Rate |
|---|---|---|---|---|---|---|---|
| Core layer | Filler | No. 3 Silica sand (Available from Rokuroya Kogyo Co., Ltd.) | (100 parts by weight) | 65 | 91 | 1.85 (Resin 0.45) | 0.99 |
|  |  | No. 7 Silica sand (Available from Rokuroya Kogyo Co., Ltd.) | (20 parts by weight) |  |  |  |  |
|  |  | Short glass fiber mono-filament Diameter: φ 12 μm/Length: 3 mm Bulk density in the mixed state: 1.72 g/cm³ | (0.4 parts by weight) |  |  |  |  |
|  | Resin | Polydiphenylmethane diisocyanate | (74 parts by weight) | 35 | 9 |  |  |
|  |  | Propylene oxide added polyether polyol | (100 parts by weight) |  |  |  |  |
|  |  | Silicone oil foam stabilizer | (1 parts by weight) |  |  |  |  |
|  |  | Water | (1 parts by weight) |  |  |  |  |
|  |  | Dibutyltin laurate catalyst | (0.3 parts by weight) |  |  |  |  |
| Surface layer | Long fiber | E glass fiber roving |  | 15 | — | 0.73 | — |
|  |  | 12 μm mono-filament bundling |  |  |  |  |  |
|  |  | (200 × 60) |  |  |  |  |  |
|  | Resin | Polyether polyol (OH value = 480) | (100 parts by weight) | 85 | — |  |  |
|  |  | Polymethylene polyphenyl polyisocyanate (NCO % = 31%) | (160 parts by weight) |  |  |  |  |
|  |  | Silicone oil foam stabilizer | (0.15 parts by weight) |  |  |  |  |
|  |  | Water | (0.7 parts by weight) |  |  |  |  |
|  |  | Dibutyltin laurate catalyst | (1.8 parts by weight) |  |  |  |  |

TABLE 13

|  |  |  | Vol. % | Wt. % | Density | Filling rate |
|---|---|---|---|---|---|---|
| Core layer | Filler | No. 3 Silica sand Bulk density: 1.42 g/cm³ Avaliable from Rokuroya Kogya Co., Ltd. (43 parts by weight) | 35 | 92 | 1.17 (Resin 0.4) | 0.64 |
|  | Resin | Polydiphenylmethane diisocyanate (140 parts by weight) Propylene oxide added polyether polyol (100 parts by weight) Silicone oil foam stabilizer (1 parts by weight) Water (1 parts by weight) Dibutyltin laurate catalyst (0.5 parts by weight) | 65 | 8 |  |  |
| Surface layer | Long fiber | E glass fiber roving |  |  | 0.73 | — |
|  |  | 12 μm mono-filament bundling (200 × 60) | 15 |  |  |  |
|  | Resin | Polyether polyol(OH value = 480) (100 parts by weight) Polymethylene polyphenyl polyisocyanate (NCO% = 31%) (160 parts by weight) Silicone oil foam stabilizer (0.15 parts by weight) Water (0.7 parts by weight) Dibutyltin laurate catalyst (1.8 parts by weight) | 85 |  |  |  |

TABLE 14

|  |  | Bending Strength | Bending modulus | Compression proportional limit | Unnailing performance | Deflection | Bending modulus in the increase of deflection |
|---|---|---|---|---|---|---|---|
| Ex. | 6 | 140 MPa | 9,900 MPa | 13 MPa | ⊚ | 0.52% | 1,370 MPa |
|  | 7 | 150 MPa | 10,000 MPa | 16 MPa | ⊚ | 0.25% | 2,100 MPa |
| Compara. Ex. | 5 | 70 MPa | 6,000 MPa | 0.4 MPa | x | 0.84% | 1,660 MPa |
|  | 6 | — | — | 8.7 MPa | ⊙ | — | — |

TABLE 15

|  | Bending strength | Bending modulus | Unnailing performance | Deflection |
|---|---|---|---|---|
| Example 6 | 140 MPa | 9,900 MPa | ⊙ | 0.52% |
| Example 8 | 160 MPa | 9,900 MPa | ⊙ | 0.62% |
| Example 9 | 150 MPa | 9,700 MPa | ⊙⊙⊙ | 0.56% |

TABLE 16

|  |  |  | Vol. % | Density | Layer Volume Ratio |
|---|---|---|---|---|---|
| Core layer | A sheet-like porous material produced by extruding foal vinyl chloride resin in which 0.05 parts by weight of ADCA was compounded in 100 parts by weight of PVC compound available from Tokuyama Sekisui Co., Ltd. | | — | 0.95 | 66 |
| Surface layer | Long fiber | E glass fiber roving | | 0.74 | 34 |
| | | 9 μm mono-filament bundling (200 × 60) | 14 | | |
| | Resin | Polymeric MDI (120 parts by weight) | | | |
| | | Propylene oxide added polyether polyol (100 parts by weight) | 86 | | |
| | | Silicone oil foam stabilizer (1 parts by weight) | | | |
| | | Water (1 parts by weight) | | | |
| | | Dibutyltin laurate catalyst (0.5 parts by weight) | | | |
| | | Void volume about 0.6 | | | |

TABLE 17

|  |  |  | Vol. % | Density | Layer Volume Ratio |
|---|---|---|---|---|---|
| Core layer | A sheet-like material produced by foaming polyurethane resin raw material in low density in which 150 parts by weight of wollastonite is added to 100 parts by weight of MDI, polyol available from Sumitomo Bayer Urethane Co., Ltd. | | — | 0.82 | 43 |
| Surface layer | Long fiber | E glass fiber roving | | 0.74 | 57 |
| | | 9 μm mono-filament bundling (200 × 60) | 14 | | |
| | Resin | Polymeric MDI (120 parts by weight) | | | |
| | | Propylene ozide added polyether polyol (100 parts by weight) | 86 | | |
| | | Silicone oil foam stabilizer (1 parts by weight) | | | |
| | | Water (1 parts by weight) | | | |
| | | Dibutyltin laurate catalyst (0.5 parts by weight) | | | |
| | | Void volume about 0.6 | | | |

TABLE 18

|  |  | Vol. % | Density | Layer Volume Ratio |
|---|---|---|---|---|
| Core layer | A sheet-like material produced by foaming polyurethane resin raw material in low density in which 300 parts by | — | 0.82 | 43 |

TABLE 18-continued

|  |  |  | Vol. % | Density | Layer Volume Ratio |
|---|---|---|---|---|---|
|  | weight of silica sand and powdered PVC is added to 100 parts by weight of MDI, polyol available from Sumitomo Bayer Urethane Co., Ltd. |  |  |  |  |
| Surface layer | Long fiber Resin | E glass fiber roving 9 μm mono-filament bundling (200 × 60) Polymeric MDI (120 parts by weight) Propylene oxide added polyether polyol (100 parts by weight) Silicone oil foam stabilizer (1 parts by weight) Water (1 parts by weight) Dibutyltin laurate catalyst (0.5 parts by weight) Void volume about 0.6 | 14 86 | 0.74 | 57 |

TABLE 19

|  |  |  | Vol. % | Density |
|---|---|---|---|---|
| Core layer |  | A sheet-like material produced by the process that after a mixture of 20 parts by weight of resol-base phenol particles (BERU PAARU available from KANEBO, LTD.) and 80 parts by weight of No. 5 silica sand was preheated, the mixture was hot-pressed at 200° C. with 20 kgf/cm³ to be molten and was allowed to react and solidified | — | 0.5 |
| Surface layer | Long fiber Resin | E glass fiber roving 9 μm mono-filament bundling (200 × 60) Polymeric MDI (120 parts by weight) Propylene oxide added polyether polyol (100 parts by weight) Silicone oil foam stabilizer (1 parts by weight) Water (1 parts by weight) Dibutyltin laurate catalyst (0.5 parts by weight) Void volume about 0.6 | 14 86 | 0.74 |

TABLE 20

|  |  |  | Vol. % | Density |
|---|---|---|---|---|
| Core layer |  | A polystyrene low power foam produced by polystyrene (available from SUMITOMO CHEMICAL CO., LTD.) being extruded and foamed. | — | 0.6 |
| Surface layer | Long fiber Resin | E glass fiber roving 9 μm mono-filament bundling (200 × 60) Polymeric MDI (120 parts by weight) Propylene oxide added polyether polyol (100 parts by weight) Silicone oil foam stabilizer (1 parts by weight) Water (1 parts by weight) Dibutyltin laurate catalyst (0.5 parts by weight) Void volume about 0.6 | 14 86 | 0.74 |

TABLE 21

|  |  |  | Vol. % | Density |
|---|---|---|---|---|
| Core layer |  | A plate-like elastic urethane foam using polyol of low elasticity-use, instead of urethane resin used for the surface layer, to adjust the elastic modulus to 100 Mpa | — | 0.7 |
| Surface layer | Long fiber Resin | E glass fiber roving 9 μm mono-filament bundling (200 × 60) Polymeric MDI (120 parts by weight) Propylene oxide added polyether polyol (100 parts by weight) Silicone oil foam stabilizer (1 parts by weight) Water (1 parts by weight) Dibutyltin laurate catalyst (0.5 parts by weight) Void volume about 0.6 | 14 86 | 0.74 |

TABLE 22

|  |  |  | Examples ||| Comparative Examples |||| Evaluation method |
|---|---|---|---|---|---|---|---|---|---|---|
|  |  | Unit | 10 | 11 | 12 | 7 | 8 | 9 | 10 |  |
| Core layer | Ca | MPa | 350 | 480 | 520 | — | 800 | 150 | 100 | JIS Z 2101 |
|  | CSa | — | 0.010 | 0.015 | 0.008 | — | 0.003 | 0.008 | 0.01 or more | — |
|  | Ea | MPa | 70 | 140 | 250 | — | 450 | 150 | 25 | JIS Z 2101 |
|  | ESa | — | 0.020 | 0.020 | 0.012 | — | 0.003 | 0.006 | 1.0 or more | — |
|  | DBa | MPa | 5.2 | 6.8 | 9.9 | — | 5.0 | 2.5 | 6.1 | — |

TABLE 22-continued

|  |  | Unit | Examples | | | Comparative Examples | | | | Evaluation method |
|---|---|---|---|---|---|---|---|---|---|---|
|  |  |  | 10 | 11 | 12 | 7 | 8 | 9 | 10 |  |
| Surface layer | Ca | MPa | 300 | 300 | 300 | 300 | 300 | 300 | 300 | JIS Z 2101 |
|  | CSa | — | 0.012 | 0.012 | 0.012 | 0.012 | 0.012 | 0.012 | 0.012 | — |
|  | Ea | MPa | 900 | 900 | 900 | 900 | 900 | 900 | 900 | JIS Z 2101 |
|  | ESa | — | 0.02 | 0.02 | 0.02 | 0.02 | 0.02 | 0.02 | 0.02 | — |
| Bending strength |  | MPa | 102 | 110 | 124 | 104 | 68 | 60 | 52 | JIS Z 2101 |
| Nailing performance |  | — | ○ | ○ | ○ | ○ | ○ | ○ | x | — |
| Unnailing performance |  | — | ○ | ○ | ○ | ○ | ○ | x | ○ | — |

TABLE 23

|  |  |  | Vol. % | Density |
|---|---|---|---|---|
| Core layer | Filler | No. 3 Silica sand<br>Particle size: 1.5 mm<br>Bulk density: 1.4 g/cm³<br>True density: 1.4 g/cm³ 0. | 55 | 1.63 |
|  | Resin | Polymeric MDI (120 parts by weight)<br>Propylene oxide added polyether polyol<br>(Hydroxyl value: 380, Polyol equivalent: 147)<br>(100 parts by weight)<br>Silicone oil foam stabilizer (0.7 parts by weight)<br>Water (1.8 parts by weight)<br>Dibutyltin laurate catalyst (0.15 parts by weight) | 45 |  |
| Surface layer | Long fiber | E glass fiber roving<br>12 μm mono-filament bundling (200 × 60) | 15 | 0.73 |
|  | Resin | Polymeric MDI (NCO = 31%) (160 parts by weight)<br>Polyether polyol (Hydroxyl value: 480) (100 parts by weight)<br>Silicone oil foam stabilizer (0.7 parts by weight)<br>Water (1.8 parts by weight)<br>Dibutyltin laurate catalyst (0.15 parts by weight) | 85 |  |
| Intermediate layer |  | A resin impregnated sheet-like material<br>(Polyester non-woven fabric (SUPAN BONDO E 1050 available from ASAHI CHEMICAL INDUSTRIAL CO., LTD.) |  |  |
|  | Resin | Polyether polyol(Hydroxyl value: 480) (100 parts by weight)<br>Polymeric MDI (NCO = 31%) (160 parts by weight)<br>Silicone oil foam stabilizer (0.7 parts by weight)<br>Dibutyltin laurate catalyst (0.15 parts by weight) |  |  |

TABLE 24

|  |  |  | Vol. % | Density |
|---|---|---|---|---|
| Core layer | Filler | No. 3 Silica sand<br>Particle size: 1.5 mm<br>Bulk density: 1.4 g/cm³<br>True density: 1.4 g/cm³ 0. | 55 | 1.63 |
|  | Resin | Polymeric MDI (120 parts by weight)<br>Propylene oxide added polyether polyol<br>(Hydroxyl value: 380, Polyol equivalent: 147)<br>(100 parts by weight)<br>Silicone oil foam stabilizer (0.7 parts by weight)<br>Water (1.8 parts by weight)<br>Dibutyltin laurate catalyst (0.15 parts by weight) | 45 |  |
| Surface layer | Long fiber | E glass fiber roving<br>12 μm mono-filament bundling (200 × 60) | 15 | 0.73 |
|  | Resin | Polymeric MDI (NCO = 31%) (160 parts by weight)<br>Polyether polyol (Hydroxyl value: 480) (100 parts by weight)<br>Silicone oil foam stabilizer (0.7 parts by weight)<br>Water (1.8 parts by weight)<br>Dibutyltin laurate catalyst (0.15 parts by weight) | 85 |  |
| Intermediate layer |  | A resin impregnated sheet-like material<br>(Glass cloth (MICRO GLASS CLOTH YEG4501 available from Nippon Sheet Glass Co., Ltd.) |  |  |
|  | Resin | Epoxy resin (ESUDAIN 400 available from Sekisui Chemical Co., Ltd.) |  |  |

TABLE 25

|  | Example 13 | Example 14 | Reference Example 1 | Reference Example 2 |
|---|---|---|---|---|
| Shear strength (MPa) | 12 | 13 | 6 | 9 |
| Bending strength (MPa) | 140 | 130 | 90 | 120 |
| Bending modulus (GPa) | 10 | 9 | 7 | 8 |
| Compression strength (MPa) | 100 | 102 | 101 | 60 |
| Wood workability | ○ | ○ | x | ○ |

TABLE 26

| | | | Vol. % | Wt. % | Density | Filling rate |
|---|---|---|---|---|---|---|
| Core layer | Filler | No. 7 Silica sand (particle size: 0.15 mm) (100 parts by weight) Expanded shale (particle size: 3 mm) (220 parts by weight) Bulk density in the mixed state (1.36 g/cm³) | 65 | 88 | 1.42 (Resin 0.45) | 0.93 |
| | Resin | Polymeric MDI (140 parts by weight) Propylene oxide added polyether polyol (100 parts by weight) Silicone oil foam stabilizer (1 parts by weight) Water (1 parts by weight) Dibutyltin laurate catalyst (0.5 parts by weight) | 35 | 12 | | |
| Surface layer | Long fiber | E glass fiber roving 9 μm mono-filament bundling (200 × 60) | 14 | | 0.74 | — |
| | Resin | Polymeric MDI (120 parts by weight) Propylene oxide added polyether polyol (100 parts by weight) Silicone oil foam stabilizer (1 parts by weight) Water (1 parts by weight) Dibutyltin laurate catalyst (0.5 parts by weight) | 86 | | | |
| Intermediate layer | Resin | Polymeric MDI (99 parts by weight) Propylene oxide added polyether polyol (100 parts by weight) Silicone oil foam stabilizer (1 parts by weight) Water (0.1 parts by weight) Dibutyltin laurate catalyst (0.5 parts by weight) | | | | |

TABLE 27

| | | | Vol. % | Wt. % | Density | Filling rate |
|---|---|---|---|---|---|---|
| Core layer | Filler | No. 7 Silica sand (particle size: 0.15 mm) (100 parts by weight) Expanded shale (particle size: 3 mm) (220 parts by weight) Bulk density in the mixed state (1.36 g/cm³) | 65 | 88 | 1.42 (Resin 0.45) | 0.93 |
| | Resin | Polymeric MDI (140 parts by weight) Propylene oxide added polyether polyol (100 parts by weight) Silicone oil foam stabilizer Water (1 parts by weight) Dibutyltin laurate catalyst (0.5 parts by weight) | 35 | 12 | | |
| Surface layer | Long fiber | E glass fiber roving 9 μm mono-filament bundling (200 × 60) | 14 | | 0.74 | — |
| | Resin | Polymeric MDI (120 parts by weight) Propylene oxide added polyether polyol (100 parts by weight) Silicone oil foam stabilizer (1 parts by weight) Water (1 parts by weight) Dibutyltin laurate catalyst (0.5 parts by weight) A resin impregnated sheet-like material (Polyester non-woven fabric (SUPAN BONDO E 1050 available from ASAHI CHEMICAL INDUSTRIAL CO., LTD.) | 86 | | | |

TABLE 27-continued

|  |  |  | Vol. % | Wt. % | Density | Filling rate |
|---|---|---|---|---|---|---|
| Intermediate layer | Resin | Polymeric MDI (99 parts by weight) Propylene oxide added polyether polyol (100 parts by weight) Silicone oil foam stabilizer (1 parts by weight) Water (0.1 parts by weight) Dibutyltin laurate catalyst (0.5 parts by weight) |  |  |  |  |

TABLE 28

|  |  |  | Vol. % | Wt. % | Density | Filling rate |
|---|---|---|---|---|---|---|
| Core layer | Filler | No. 7 Silica sand (particle size: 0.15 mm) (100 parts by weight) |  |  | 1.42 (Resin 0.45) | 0.93 |
|  |  | Expanded shale (particle size: 3 mm) (220 parts by weight) Bulk density in the mixed state (1.36 g/cm³) | 65 | 88 |  |  |
|  | Resin | Polymeric MDI (140 parts by weight) Propylene oxide added polyether polyol (100 parts by weight) Silicone oil foam stabilizer Water (1 parts by weight) Dibutyltin laurate catalyst (0.5 parts by weight) | 35 | 12 |  |  |
| Surface layer | Long fiber | E glass fiber roving 9 μm mono-filament bundling (200 × 60) | 14 |  | 0.74 | — |
|  | Resin | Polymeric MDI (120 parts by weight) Propylene oxide added polyether polyol (100 parts by weight) Silicone oil foam stabilizer (1 parts by weight) Water (1 parts by weight) Dibutyltin laurate catalyst (0.5 parts by weight) A resin impregnated sheet-like material (vinylon non-woven fabric (SPUN LACE available from KURARAY CO., LTD., Weight: 55 g/cm²) | 86 |  |  |  |
| Intermediate layer | Resin | Polymeric MDI (99 parts by weight) Propylene oxide added polyether polyol (100 parts by weight) Silicone oil foam stabilizer (1 parts by weight) Water (0.1 parts by weight) Dibutyltin laurate catalyst (0.5 parts by weight) |  |  |  |  |

TABLE 29

|  | Example 15 | Example 16 | Example 17 | Comparative Example 5 |
|---|---|---|---|---|
| Shear strength (MPa) | (7.6) | 7.8 | 7 | 5.2 |
| Destruction conformation | Destruction of matrix of core layer | Destruction of interface | Destruction of interface | Destruction of interface |
| Bending strength (MPa) | 135 | 135 | 135 | 70 |
| Bending modulus (MPa) | 9,700 | 9,800 | 9,800 | 6,000 |
| Durability against repeated bending | ○ | ⊚ | ○ | x |
| Destruction caused by repeated bending | ○ | ○ | ○ | x |

What is claimed is:

1. A composite material comprising:
   a core layer comprising a particulate filler having an average particle size of 0.5 mm or more and synthetic resin and containing the filler having a weight 0.7 times or more the product of volume of the core layer and bulk density of the filler; and
   a surface layer comprising a thermosetting resin reinforced by long fibers extending parallel in a longitudinal direction thereof, said long fibers being present in an amount of 5 volume % to 40 volume %; and the surface layer being laminated on the core layer to cover at least one surface of the core layer with respect to a thickness direction thereof.

2. The composite material according to claim 1, wherein the surface layer has a density of 0.3 g/cm³ or more to 1.5 g/cm³ or less.

3. The composite material according to claim 1, which comprises the surface layer having a bending modulus of 6,000 MPa or more and a bending strength of 100 MPa or more.

4. The composite material according to claim 1, wherein the filler has two or more peak areas that constitute 8 volume % or more on a particle size distribution curve plotting particle size in abscissa and a volume ratio of filler per particle size to all fillers in ordinate and also has the size distribution that most frequent particle size values in the smaller peak area of 8 volume % or more is 0.7 or less of most frequent particle size values in the larger peak area of 8, volume % or more next to the smaller peak area.

5. The composite material according to claim 1, wherein the synthetic resin forming the core layer is thermosetting resin.

6. The composite material according to claim 1, wherein the synthetic resin forming the core layer is thermoplastic resin.

7. The composite material according to claim 1, wherein the synthetic resin forming the core layer is thermosetting polyurethane resin foam of polyol equivalent of 230 or more to 1,500 or less or thermosetting polyurethane resin foam having a density of 0.3 g/cm$^3$ or more and polyol equivalent of 1,500 or less.

8. The composite material according to claim 1, wherein the core layer is formed by a plurality of core layer forming composition layers.

9. The composite material according to claim 8, wherein one of the core layer forming composition layers is thermosetting resin reinforced by long fibers extending parallel in a longitudinal direction thereof or thermosetting resin including lightweight filler reinforced by long fibers extending parallel in a longitudinal direction thereof.

10. The composite material according to claim 1, wherein the core layer has a compression shear strength DBa of 5 MPa or more.

11. The composite material according to claim 1, wherein the core layer and the surface layer are integrally adhesive bonded to each other through an intermediate layer comprising non-foam thermosetting resin or low-power foam resin.

12. The composite material according to claim 11, wherein an intermediate layer portion has the compression shear strength of 6 MPa or more, or the surface layer and the core layer both have the compression shear strength of 6 MPa or more, when compressive force is applied to the composite material in a direction parallel to the fiber extending direction of the long fibers of the surface layer so that a breaking surface can be formed in the intermediate layer portion, and wherein the composite material has the physical property that either the surface layer or the core layer is first broken when the compressive force is applied to the composite material in the direction parallel to the fiber extending direction of the long fibers of the surface layer so that the breaking surface can be formed in the intermediate layer portion.

13. The composite material according to claim 11, wherein a resin-impregnated sheet-like material is arranged in the intermediate layer.

14. The composite material according to claim 1, wherein the synthetic resin of the core layer is polyurethane resin foam and the resin of the surface layer is polyurethane resin foam.

15. The composite material according to claim 1, which has a total thickness of 100 mm or more and a ratio between a thickness of the core layer and a sum total of thickness of the surface layer covering the core layer in the thickness direction is within the range of 9/1 to 1/1.

16. The composite material according to claim 9, wherein the core layer has at least two core layer forming composition layers (A) comprising filler and synthetic resin and at least one core layer forming composition layer (B) comprising thermosetting resin reinforced by long fibers interposed between two core layer forming compositions (A),(A) of the at least two core layer forming composition layers (A) and extending parallel in a longitudinal direction of the composite material, and wherein a ratio between a sum total of thickness of the core layer forming composition layer (A) and a sum total of thickness of the core layer forming composition layer (B) is within the range of 95/5 to 50/50.

17. The composite material according to claim 1, wherein the surface layer is laminated on the core layer to cover at least two surfaces of the corer layer with respect to a thickness direction thereof; the composite material has a total thickness of 100 mm or more with respect to a thickness direction thereof; and a thickness of the surface layer on the side thereof on which a pulling force is exerted when the composite material is bent in the thickness direction is 5% or more to 25% or less of the total thickness and the thickness of the surface layer on the side thereof on which a compressive force is exerted is 1.5% or more to 15% or less of the total thickness.

18. The composite material according to claim 1, wherein the surface layer surrounds four surfaces of the core layer and constitutes 10 volume % or more to 65 volume % or less of the total of the composite material.

19. A synthetic cross tie comprising a composite material according to claim 1.

20. The composite material according to claim 12, wherein a resin-impregnated sheet-like material is arranged in the intermediate layer.

21. The composite material according to claim 18, wherein the core layer has at least two core layer forming composition layers (A) comprising filler and synthetic resin and at least one core layer forming composition layer (B) comprising thermosetting resin reinforced by long fibers interposed between two core layer forming compositions (A),(A) of the at least two core layer forming composition layers (A) and extending parallel in a longitudinal direction of the composite material, and wherein a ratio between a sum total of thickness of the core layer forming composition layer (A) and a sum total of thickness of the core layer forming composition layer (B) is within the range of 95/5 to 50/50.

22. A composite material comprising:
  a core layer comprising a particulate filler having an average particle size of 0.5 mm or more and synthetic resin and containing the filler having a weight 0.7 times or more the product of volume of the core layer and bulk density of the filler; and
  a surface layer comprising a thermosetting resin including lightweight filler reinforced by long fibers extending parallel in a longitudinal direction thereof, said long fibers being present in an amount of 5 volume % to 40 volume %; and the surface layer being laminated on the core layer to cover at least one surface of the core layer with respect to a thickness direction thereof.

23. The composite material according to claim 22, wherein the surface layer has a density of 0.3 g/cm$^3$ or more to 1.5 g/cm$^3$ or less.

24. A composite material comprising a core layer comprising filler and synthetic resin and a surface layer comprising synthetic resin foam and laminated on the core layer to cover at least one surface of the core layer with respect to a thickness direction thereof, wherein a variation curve of bending stress of the core layer that varies with the bending and deflection has a singular point at which slope of the tangent line decreasing gradually from the point in time at which the bending is started increases again before becoming negative.

25. The composite material according to claim 24, wherein the synthetic resin foam is thermosetting resin foam reinforced by long fibers extending parallel in a longitudinal direction thereof.

26. The composite material according to claim 24, wherein the core layer has deflection of 0.8% or less at the singular point.

27. The composite material according to claim 24, wherein the core layer has the bending modulus of 800 MPa or more when further deflected from deflection at the singular point.

28. The composite material according to claim 25, wherein the core layer has deflection of 0.8% or less at the singular point.

29. A composite material comprising a core layer comprising synthetic resin as a main component and a surface layer comprising foam thermosetting resin reinforced by long fibers extending parallel in a longitudinal direction thereof or elastic synthetic resin reinforced by long fibers extending parallel in a longitudinal direction thereof and laminated on the core layer to cover both surfaces of the core layer with respect to a thickness direction thereof, wherein the core layer and the surface layer have the relation that satisfies the equations of $CSa \geq \frac{1}{2} \times CSb$, $Ea < Eb$, and $ESa \geq \frac{1}{2} \times ESb$ (where CSa represents yield strain in compression of the core layer; CSb represents yield strain in compression of the surface layer; Ea represents a tension elasticity modulus of the core layer; Eb represents a tension elasticity modulus of the surface layer; ESa represents yield strain in tension of the core layer; and ESb represents yield strain in tension of the surface layer).

30. The composite material according to claim 29, wherein it follows that $0.005 \leq CSa$, $50 \text{ MPa} \leq Ea$, $0.005 \leq ESa$, $0.01 \leq CSb$, $5,000 \text{ MPa} \leq Eb \leq 18,000 \text{ MPa}$, and $0.01 \leq ESb$.

* * * * *